US012333271B2

(12) United States Patent
Kim

(10) Patent No.: US 12,333,271 B2
(45) Date of Patent: Jun. 17, 2025

(54) PROCESSING DEVICE USING HETEROGENEOUS FORMAT INPUT

(71) Applicant: REBELLIONS INC., Seongnam-si (KR)

(72) Inventor: Jinseok Kim, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/892,274

(22) Filed: Sep. 20, 2024

(65) Prior Publication Data

US 2025/0103289 A1    Mar. 27, 2025

(51) Int. Cl.
*G06F 7/487*   (2006.01)
*G06F 5/01*   (2006.01)
*G06F 7/544*   (2006.01)

(52) U.S. Cl.
CPC ............ *G06F 7/4876* (2013.01); *G06F 5/012* (2013.01); *G06F 7/5443* (2013.01); *G06F 2207/3824* (2013.01)

(58) Field of Classification Search
CPC ...... G06F 7/4876; G06F 7/5443; G06F 5/012; G06F 2207/3824
See application file for complete search history.

(56) References Cited

U.S. PATENT DOCUMENTS

| | | | |
|---|---|---|---|
| 6,205,462 B1 * | 3/2001 | Wyland ................. | G06F 7/5443 708/503 |
| 6,751,644 B1 * | 6/2004 | Chng ..................... | G06F 7/4876 708/501 |
| 11,042,360 B1 | 6/2021 | Clark et al. | |
| 2014/0188966 A1 * | 7/2014 | Galal .................... | G06F 7/5443 708/501 |
| 2015/0199173 A1 * | 7/2015 | Lutz ...................... | G06F 7/5443 708/209 |
| 2018/0095749 A1 * | 4/2018 | Elmer ................. | G06F 7/49952 |
| 2020/0310755 A1 * | 10/2020 | Mueller ............... | G06F 7/4876 |
| 2022/0075598 A1 * | 3/2022 | Werner ................ | G06F 7/5443 |
| 2024/0134601 A1 * | 4/2024 | Agrawal ................ | G06F 7/483 |

OTHER PUBLICATIONS

Office Action for KR 10-2023-0170013 by Korean Intellectual Property Office dated Dec. 17, 2024.

* cited by examiner

*Primary Examiner* — Matthew D Sandifer
(74) *Attorney, Agent, or Firm* — BROADVIEW IP LAW, PC

(57) ABSTRACT

A processing device comprises multiplier circuitry configured to output a product of mantissas represented by first and second signals in response to a mode signal and output a product of an integer represented by the first signal and a mantissa represented by the second signal in response to the mode signal. The processing device further includes an aligning circuit configured to shift a mantissa part of a third signal based on an exponent part of the third signal and an exponent of a product of the first and second signal to generate and output a shifted signal. The processing device further includes an arithmetic logic circuit configured to output a mantissa of a sum of a product of the first and second signals and the third signal in response to an output signal of the aligning circuit and an output signal of the multiplier circuitry.

17 Claims, 18 Drawing Sheets

| 1010 | 0 | 1 | | | * | | mex0 = 0 |
| 1020 | | 0 | 1 | | * | | mex0 = 1 |
| 1030 | | 0 | | 1 | * | | mex0 = 2 |
| 1040 | | 0 | | 1 | * | | mex0 = 3 |
| 1050 | | 0 | | | 1 | * | mex0 = 4 |
| 1060 | | 0 | | | 1 | * | mex0 = 5 |
| 1070 | | 0 | | | | * | mex0 = 6 |

FIG. 10

PROCESSING DEVICE USING HETEROGENEOUS FORMAT INPUT

CROSS-REFERENCE TO RELATED APPLICATION

This application claims priority to Korean Patent Application No. 10-2023-0126903 and No. 10-2023-0170013, filed in the Korean Intellectual Property Office on Sep. 22, 2023, and Nov. 29, 2023, respectively, the entire contents of which are hereby incorporated by reference.

FIELD

The present disclosure relates to a processing device using heterogeneous format input, and specifically, to a heterogeneous format input operator that receives bit patterns of different formats, performs binary operation, and calculates and outputs operation results and an operation method thereof.

BACKGROUND

A floating point unit (FPU) is an operator circuit that performs a bit operation in the form of floating point representation format and is widely used in various fields. As an example, the floating point unit may be used for the computation of an output value of a multilayer perceptron (MLP) of an artificial neural network implemented based on the structure of a biological neural network, and may be included in a computing device such as a graphical processing unit (GPU) or a tensor processing unit (TPU) used in the stages of the artificial neural network training and application. For example, multiplication and/or addition of floating point numbers may be performed in the process of applying weights and biases to the data input from the previous layer and outputting the results.

Meanwhile, some artificial neural network models with optimized performance have the values of activations and/or weights configured in different formats, such as floating point representation format and integer representation format, thus requiring operations to be performed between data in heterogeneous formats. However, using the related floating point unit has limitations. That is, it is not possible to receive inputs in representation formats other than the floating point representation format, or it is required to convert the inputs in other formats into the floating point representation format for operation thereof. Due to these limitations, there is a problem that it is not possible to use a data format requiring a smaller memory than the floating point representation format even when it is not necessary to use the data in floating point representation format, or the computing resources are unnecessarily wasted in converting the data into the floating-point format and using the same. In particular, when operating artificial neural networks using up to hundreds of billions of parameters, these factors are accumulated, resulting in enormous waste of computing resources.

Therefore, a new design of an operator structure that can solve these problems and introduction thereof are necessary.

SUMMARY

In order to solve one or more problems (e.g., the problems described above and/or other problems not explicitly described herein), the present disclosure provides an operator (apparatus) and an operation method using heterogeneous format input.

The operator using heterogeneous format input, may include an input unit that receives a first bit pattern of a first format associated with a first operand and a second bit pattern of a second format associated with a second operand, wherein the first format and the second format are different from each other, a multiplier that outputs a third bit pattern associated with a product of the first operand and the second operand and an output unit that outputs an operation result calculated based on the third bit pattern.

The first format may be an integer format, and the second format may be a floating point format.

The second bit pattern may include an exponent field and a mantissa field, and the third bit pattern may include information corresponding to a binary multiplication result of the first bit pattern and the mantissa field of the second bit pattern.

The number of bits of the first bit pattern may be less than the number of bits of the second bit pattern.

A factor associated with the first operand, which is input to the multiplier, may be determined based on the first format.

The factor associated with the first operand may be determined, in response to the first format being an integer format, to be the first bit pattern, and the factor associated with the first operand may be determined, in response to the first format being a floating point format and the first bit pattern including an exponent field and a mantissa field, to be the mantissa field of the first bit pattern.

The maximum number of bits of a factor may be set in the multiplier, and the multiplier may perform, in response to a sum of a number of bits of a plurality of factors to be processed in the multiplier is within the maximum number of bits, a plurality of multiplication operations associated with the plurality of factors in parallel.

The input unit may receive a fourth bit pattern of the second format associated with a third operand, the operator may further include an adder that outputs a fifth bit pattern associated with a value obtained by adding the third operand to the product of the first operand and the second operand, based on the third bit pattern and the fourth bit pattern, and the output unit may output an operation result calculated based on the fifth bit pattern.

The operator may further include an aligner that performs, a shift operation on a bit pattern, for exponent alignment of the bit pattern.

The second bit pattern may include an exponent field and a mantissa field, the fourth bit pattern may include an exponent field and a mantissa field, and the aligner may perform, in response to a determination that the exponent field of the second bit pattern and the exponent field of the fourth bit pattern are different from each other, a shift operation on at least one of the mantissa field of the fourth bit pattern or the third bit pattern.

The aligner may perform a shift operation on the mantissa field of the fourth bit pattern, based on a difference between a value of the exponent field of the second bit pattern and a value of the exponent field of the fourth bit pattern, and the fifth bit pattern may be calculated by a binary addition of the third bit pattern and the mantissa field of the fourth bit pattern that is shifted by the shift operation.

A sixth bit pattern associated with the operation result may be determined based on the fifth bit pattern, and the sixth bit pattern may include an exponent field and a mantissa field.

The operator may further include a leading zero anticipator that determines a position on the fifth bit pattern where 1 occurs for the first time from a most significant bit of the fifth bit pattern, wherein the exponent field of the sixth bit pattern may be determined based on the position on the fifth bit pattern determined by the leading zero anticipator.

The second bit pattern may include an exponent field and a mantissa field, and the exponent field of the sixth bit pattern may be determined based on the position on the fifth bit pattern determined by the leading zero anticipator, a most significant bit position of the mantissa field of the second bit pattern, and the exponent field of the second bit pattern.

The operator may further include a normalizer, wherein a shift operation may be performed on the fifth bit pattern based on the position on the fifth bit pattern determined by the leading zero anticipator, and the normalizer may determine the mantissa field of the sixth bit pattern by truncating or rounding bits other than a predetermined number of bits in the fifth bit pattern that is shifted.

The operation method using heterogeneous format input, the method being performed by an operator including a multiplier may include receiving a first bit pattern of a first format associated with a first operand and a second bit pattern of a second format associated with a second operand, wherein the first format and the second format are different from each other, outputting, by the multiplier, a third bit pattern associated with a product of the first operand and the second operand; and outputting an operation result calculated based on the third bit pattern.

The operation method may further include receiving a fourth bit pattern of the second format associated with the third operand and outputting a fifth bit pattern associated with a value obtained by adding the third operand to the product of the first operand and the second operand based on the third bit pattern and the fourth bit pattern, wherein the outputting the operation result may include outputting the operation result calculated based on the fifth bit pattern.

The second bit pattern may include an exponent field and a mantissa field, the fourth bit pattern may include an exponent field and a mantissa field, and the method further may include, performing, in response to a determination that the exponent field of the second bit pattern and the exponent field of the fourth bit pattern are different from each other, a shift operation on at least one of the mantissa field of the fourth bit pattern or the third bit pattern.

The performing the shift operation may include performing a shift operation on the mantissa field of the fourth bit pattern, based on a difference between a value of the exponent field of the second bit pattern and a value of the exponent field of the fourth bit pattern, and the fifth bit pattern may be calculated by a binary addition of the third bit pattern and the mantissa field of the fourth bit pattern that is shifted by the shift operation.

The outputting the operation result calculated based on the fifth bit pattern may include outputting a sixth bit pattern associated with the operation result, which is determined based on the fifth bit pattern, the sixth bit pattern may include an exponent field and a mantissa field, the operation method may further include: determining a position on the fifth bit pattern where 1 occurs for the first time from a most significant bit of the fifth bit pattern, performing a shift operation on the fifth bit pattern based on the determined position on the fifth bit pattern and determining the mantissa field of the sixth bit pattern by truncating or rounding bits other than a predetermined number of bits in the fifth bit pattern that is shifted, and the exponent field of the sixth bit pattern may be determined based on the determined position on the fifth bit pattern.

A processing device may include multiplier circuitry having a first port configured to receive a signal part covering a mantissa part and an integer part of a first electronic logic signal, a second port configured to receive a mantissa part of a second electronic logic signal, and an output port configured to output an electronic logic signal representing a product of mantissas represented by the mantissa parts of the first and second electronic logic signals in response to a mode signal indicating that the first electronic logic signal represents a floating-point number and output an electronic logic signal representing a product of an integer represented by the integer part and a mantissa represented by the mantissa part of the second electronic logic signal in response to the mode signal indicating that the first electronic logic signal represents an integer, an aligning circuit having a first port configured to receive an exponent part of a third electronic logic signal, a second port configured to receive an electronic logic signal representing an exponent of a product of the first and second electronic logic signals, and a third port configured to receive a mantissa part of the third electronic logic signal, the aligning circuit being configured to shift a signal applied to the third port of the aligning circuit based on signals applied to the first and second ports of the aligning circuit to generate and output a shifted electronic logic signal to an output port, and an arithmetic logic circuit having a first port which a signal outputted from the output port of the aligning circuit is applied, a second port which a signal outputted from the output port of the multiplier circuitry is applied, and an output port configured to output an electronic logic signal representing a mantissa of a sum of a product of the first and second electronic logic signals and the third electronic logic signal in response to signals applied to the first and second ports of the arithmetic logic circuit.

The processing device may further include a first exponent calculating circuit having a first port configured to receive an exponent part of the first electronic logic signal, a second port configured to receive an exponent part of the second electronic logic signal, and an output port configured to output an electronic logic signal representing an exponent of a product of the first and second electronic logic signals in response to signals applied to the first and second ports of the first exponent calculating circuit.

The electronic logic signal outputted from the output port of the first exponent calculating circuit may be generated further in response to the mode signal indicting whether the first electronic logic signal represents a floating-point number or an integer.

The output port of the first exponent calculating circuit may be configured to output an electronic logic signal representing a sum of exponents represented by the first and second exponent parts in response to the mode signal indicating that the first electronic logic signal represents a floating-point number, and output an electronic logic signal representing the exponent part of the second electronic logic signal in response to the mode signal indicating that the first electronic logic signal represents an integer.

The first exponent calculating circuit may include an adding circuit having a first port configured to receive the exponent part of the first electronic logic signal, a second port configured to receive the exponent signal part of the second electronic logic signal, and output port configured to output an electronic logic signal representing a sum of exponents represented by the first and second exponent parts, and a multiplexer circuit having a first port electrically connected to the output port of the adding circuit, a second port configured to receive the exponent part of the second electronic logic signal, and an output port configured to output a signal applied to the first port in response to the mode signal indicating that the first electronic logic signal represents a floating-point number and output a signal applied to the second port in response to the mode signal indicating that the first electronic logic signal represents an integer.

The aligning circuit may include a bit extender circuit having an input port configured to receive the mantissa part of the third electronic logic signal and an output port configured to output an extended electronic logic signal of the mantissa part of the third electronic logic signal, a subtractor circuit having a first port configured to receive the exponent part of the third electronic logic signal, a second port configured to receive an electronic logic signal representing an exponent of a product of the first and second electronic logic signals, and an output configured to output a difference between signals applied to the first and second ports, and a shifter circuit having a first port electrically connected to the output port of the bit extender circuit and a second port electrically connected to the output port of the subtractor circuit, the shifter circuit being configured to shift a signal applied to the first port based on a signal applied to the second port to generate the shifted electronic logic signal.

The multiplier circuitry may include a first multiplier circuit having a first port configured to receive the mantissa part of the first electronic logic signal, a second port configured to receive the mantissa part of the second electronic logic signal, and an output port configured to output an electronic logic signal representing a product of mantissas represented by the mantissa parts of the first and second electronic logic signals, a second multiplier circuit having a first port configured to receive the integer part, a second port configured to receive the mantissa part of the second electronic logic signal, and an output port configured to output an electronic logic signal representing a product of an integer represented by the integer part and a mantissa represented by the mantissa part of the second electronic logic signal, and a multiplexer circuit having a first port electrically connected to the output port of the first multiplier circuit, a second port electrically connected to the output port of the second multiplier circuit, and an output port configured to output a signal applied to the first port in response to the mode signal indicating that the first electronic logic signal represents a floating-point number and output a signal applied to the second port in response to the mode signal indicating that the first electronic logic signal represents an integer.

The multiplier circuitry may further include a bit extender circuit having an input port electrically connected to the output port of the multiplexer, the bit extender circuit being configured to extend a signal applied to the input port of the bit extender circuit to generate an extended electronic logic signal to be outputted to the output port of the multiplier circuitry.

The arithmetic logic circuit may further have a third port which an electronic logic signal representing the first exponent is applied and may be configured to output an electronic logic signal representing an exponent of a sum of a product of the first and second electronic logic signals and the third electronic logic signal in response to signals applied to the first, second and third ports of the arithmetic logic circuit.

The processing device may further include a plurality of first registers configured to store and output a first electronic logic signal, a second electronic logic signal, and a third electronic logic signal.

The number of bits in the electronic logic signal outputted from the output port of the multiplier circuitry may be greater than a sum of the number of bits representing mantissas represented by the mantissa part of the first electronic logic signal and the number of bits representing mantissas represented by the mantissa part of the second electronic logic signal.

A plurality of most significant bits of the electronic logic signal may have zero value and a plurality of least significant bits of the electronic logic signal may have zero value.

The arithmetic logic circuit may include a plurality of second registers configured to store and output an electronic logic signal outputted from the output port of the aligning circuit and an electronic logic signal outputted from the output port of the multiplier circuitry.

The arithmetic logic circuit may further include an adding circuit having a first port which the electronic logic signal outputted from the output port of the aligning circuit is applied, a second port which the electronic logic signal outputted from the output port of the multiplier circuitry is applied, and an output port configured to output an electronic logic signal representing a sum of an electronic logic signal applied to the first port and an electronic logic signal applied to the second port.

The arithmetic logic circuit may further include a leading zero anticipating circuit having a first port which the electronic logic signal outputted from the output port of the aligning circuit is applied, a second port which the electronic logic signal outputted from the output port of the multiplier circuitry is applied, and an output port configured to output an electronic logic signal representing an anticipated number of leading zeros in a sum of an electronic logic signal applied to the first port and an electronic logic signal applied to the second port.

The arithmetic logic circuit may further include a plurality of third registers configured to store and output an electronic logic signal outputted from the output port of the leading zero anticipating circuit and an electronic logic signal outputted from the output port of the adding circuit.

The arithmetic logic circuit may further include a normalizing circuit having a first port configured to receive an electronic logic signal outputted from the output port of the adding circuit, a second port configured to receive an electronic logic signal outputted from the output port of the leading zero anticipating circuit, and an output port configured to output an electronic logic signal representing a mantissa of a sum of a product of the first and second electronic logic signals and the third electronic logic signal in response to signals applied to the first and second ports of the arithmetic logic circuit.

The arithmetic logic circuit may further include a second exponent calculating circuit having a first port configured to receive an electronic logic signal outputted from the output port of the adding circuit, a second port configured to receive an electronic logic signal outputted from the output port of the leading zero anticipating circuit, and an output port configured to output an electronic logic signal representing an exponent of a sum of a product of the first and second electronic logic signals and the third electronic logic signal in response to signals applied to the first and second ports of the arithmetic logic circuit.

The arithmetic logic circuit may further include a plurality of fourth registers configured to store and output an electronic logic signal outputted from the output port of the second exponent calculating circuit and an electronic logic signal outputted from the output port of the normalizing circuit.

According to some aspects of the present disclosure, by calculating the multiplication result of the operand without separate conversion to the floating point representation format based on the bit pattern in the integer representation format and the bit pattern in the floating point representation format, the hardware resource required by the operator for operation can be reduced. For example, the bit-width of the result value of the multiplier can be reduced compared to the case of performing binary multiplication between mantissa fields, and the operation can be performed using the multiplier and/or the adder that process a smaller bit width.

According to some aspects of the present disclosure, depending on circumstance, one multiplier in the operator may perform both types of operations (floating-point & floating-point or floating-point & integer).

According to some aspects of the present disclosure, it is possible to perform a plurality of multiplication operations associated with a plurality of factors in parallel, thereby improving the operation performance of the operator.

According to some aspects of the present disclosure, it is possible to reduce the frequency of truncations according to exponent alignment by the dynamic bit shift, thereby increasing the accuracy of the operation.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 10 is a diagram illustrating an example in which the number of bits of dynamic bit shift is determined based on a bit pattern;

DETAILED DESCRIPTION

Figure 1:
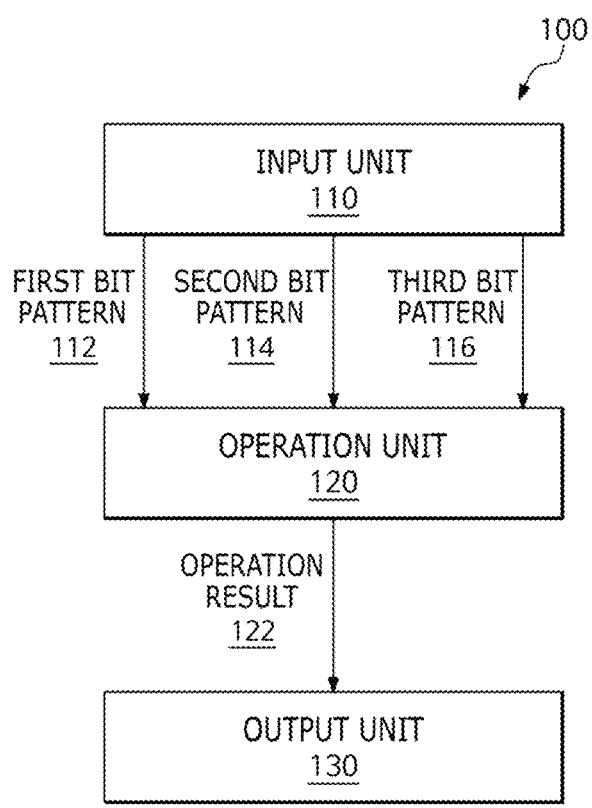
FIG. 1 illustrates an example of an operator.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory, or may be implemented as a circuit (circuitry). Terms such as "circuit (or circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

Before describing various examples of the present disclosure, terms used herein will be explained.

In the present disclosure, a "bit pattern" may refer to a combination of a plurality of bits or a value represented by the combination of the bits. In addition, the "bit pattern" may refer to a combination of specific bits and also refer to a combination of bits in which any number of "zero" bits are continuously filled adjacent to the most significant bit and/or the least significant bit of the combination of the specific bits.

In the present disclosure, an "integer representation format (or, integer format)" may refer to a format for representing an integer using a bit pattern. For example, the "integer representation format" may refer to the 2's complement representation format. Alternatively, the "integer representation format" may refer to a 1's complement representation format or a format using a bit pattern including a sign bit. The "integer representation format" may include data types of various sizes/formats such as int, short, long, and the unsigned format associated therewith, but is not limited thereto. The "integer representation format" may be an INT8 format. The "integer representation format" and "integer format" can be used interchangeably.

In the present disclosure, the "floating point representation format (or, floating point format)" may refer to a format that represents a real number using a bit pattern. For example, the "floating point representation format" may refer to a format for representing a real number using a bit pattern that optionally includes a bit (sign bit) representing the sign of the real number, and includes a bit (exponent bit) representing the exponent of the real number and a bit (mantissa bit) representing the mantissa of the real number. The "floating point representation format" may include data types of various sizes such as float, double, and long double, and may be represented using the floating point notation standards such as IEEE 754. The "floating point representation format" may be an FP16 format. The FP16 format may include IEEE 754 half precision format (in which the sign bit, the exponent bit, and the mantissa bit are 1 bit, 5 bits, and 10 bits, respectively), bfloat16 format (in which the sign bit, the exponent bit, and the mantissa bit are 1 bit, 8 bits, and 7 bits, respectively), and DLFloat format (in which the sign bit, the exponent bit, and the mantissa bit are 1 bit, 6 bits, and 9 bits, respectively), but is not limited to, and the FP16 format may include various formats in which the sum of the sign bit, the exponent bit, and the mantissa bit is 16 bits. The "floating point representation format" and "floating point format" can be used interchangeably.

In the present disclosure, the "mantissa field" may refer to a combination of a plurality of bits for representing a mantissa or a significant digit of a real number in the floating point representation format, or a value determined from the combination. In this case, the plurality of bits may include an implicit bit. For example, if the explicit bit representing the mantissa in a bit pattern represented using standards such as IEEE 754 is "110110101', depending on cases, the "mantissa field" of the bit pattern described above should be understood to refer to "110110101" (without the implicit bit), "1110110101" (with the implicit bit), "0000000110110101", etc. (patterns with the high order bits filled with zeros), or "$1.110110101_{(2)}$" (value).

In the present disclosure, the "exponent field" may refer to a combination of a plurality of bits for representing the exponent of the real number in the floating point representation format or a value determined from the combination.

In the present disclosure, a "leading zero anticipator" (LZA) may refer to a component unit of an operator for determining (or, predicting or anticipating), in a specific bit pattern, a position where 0 appears for the first time and/or a position where 1 appears for the first time from the most significant bit of the bit pattern. For example, the leading zero anticipator may count the number of opposite bits from the most significant bit of the bit pattern until a bit value to determine a position appears, so as to determine a position where 0 appears for the first time and/or a position where 1 appears for the first time from the most significant bit.

In the present disclosure, "position move" or "shift" may refer to an action/operation of moving a bit or a bit pattern in a left direction or right direction. In addition, the "position move" or "shift" may also include a truncate or rounding operation. For example, if some bits are out of the allowable range upon performing the position move or shift of the bit pattern, the truncate or rounding operation may be performed on out-of-range bits to remove some bits, and these operations should be interpreted as being included in some cases and not necessarily included.

In the present disclosure, "exponent alignment" may refer to a process of performing the position move or shift of the mantissa field so that the exponent of a specific operand matches the exponent of another operand based on the exponent of the operand or the exponent field associated with the operand. For example, if the exponents of two operands are different from each other, the mantissa field of the operands with smaller exponents may be shifted to the right to perform the exponent alignment.

Hereinafter, various examples of the present disclosure will be described in detail with reference to the accompanying drawings.

FIG. 1 illustrates an example of an operator 100. The operator 100 may include an input unit 110, an operation unit 120, and an output unit 130. The input unit 110 may receive a plurality of bit patterns from a main memory, a cache memory, a register, etc., and transmit the received bit patterns to the operation unit 120. Although FIG. 1 illustrates that the input unit 110 receives a first bit pattern 112, a second bit pattern 114, and a third bit pattern 116 and transmits the received bit patterns to the operation unit 120, this is for convenience of explanation, and the input unit 110 may receive and transmit any number of bit patterns.

The bit patterns 112, 114, and 116 may be associated with operands corresponding to each, and may be bit patterns represented in different formats. For example, the first bit pattern 112 may be a bit pattern in which the first operand is represented in a first format, the second bit pattern 114 may be a bit pattern in which the second operand is represented in a second format, and the third bit pattern 116 may be a bit pattern in which the third operand is represented in a third format. In this case, the first format and the second format may be different from each other, and the second format and the third format may be the same as each other. For example, the first format may be an integer representation format, and the second format and the third format may be a floating point representation format.

The operation unit 120 may perform an operation of the operand associated with the bit pattern using the bit patterns 112, 114, and 116 transmitted to the operation unit 120. For example, the operation unit 120 may perform addition and/or multiplication operations between operands and transmit the result 122 of the performed operation to the output unit 130.

The operation unit 120 may include a sub-block such as a multiplier, an adder, an aligner, a leading zero anticipator (LZA), an exponent calculator, and/or a normalizer, based on the type of operation to be performed by the operation unit 120, and the sub-blocks may be coupled to each other. These sub-blocks will be described in detail with reference to FIG. 3.

The operation unit 120 may be configured to perform an addition operation, a multiplication operation, a floating-point Multiply-and-Add (FMA) operation, etc. For example, the operation unit 120 may determine the operation result 122 based on a bit pattern associated with a value obtained by adding a third operand to a product of the first operand and the second operand, and transmit the result to the output unit 130. A detailed configuration of the operation unit 120 for performing an FMA operation etc. will be described below in detail with reference to FIG. 3.

The output unit 130 may receive the operation result 122 and output the received result to the outside of the operator 100.

Figure 2:
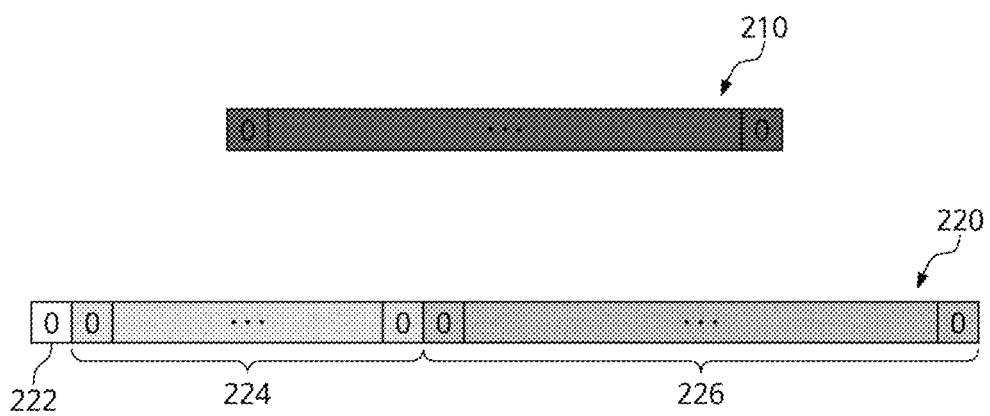
FIG. 2 is a diagram illustrating an example of formats of bit patterns.

FIG. 2 is a diagram illustrating an example of formats of bit patterns 210 and 220. The first bit pattern 210 may be a bit pattern represented in the integer representation format. For example, the first bit pattern 210 may be a bit pattern represented by the 2's complement method. Alternatively, the first bit pattern 210 may be a bit pattern that is represented in the 1's complement method or that includes a sign bit indicating the sign of an integer operand associated with the first bit pattern 210 and a bit indicating the size of an integer.

The second bit pattern 220 may be a bit pattern represented in the floating point representation format (e.g., IEEE 754 standard format). The second bit pattern 220 may include a sign bit 222 indicating a sign of a real operand, an exponent field 224 indicating an exponent, and a mantissa field 226 indicating a mantissa. For example, if the second bit pattern 220 includes 16 bits, the exponent field 224 may include 6 bits, and the mantissa field 226 may include 9 bits (or 10 bits including implicit bit). In some cases, the sign bit 222 may be omitted, and the number of bits included in the exponent field 224 or the mantissa field 226 may increase by one.

The exponent field 224 may be determined by summing the exponent value of the operand represented by the second bit pattern 220 and the bias. Because the exponent field 224 is determined by adding the bias, the exponent may be represented using the exponent field 224 regardless of the sign of the exponent of the operand.

The mantissa field 226 may represent the mantissa or a significant digit of the real operand. The mantissa field 226 may include an implicit bit. For example, if the explicit bit of the mantissa field 226 is "110110101", the mantissa field 226 may indicate that the mantissa of the operand associated with the second bit pattern 220 is "$1.110110101_{(2)}$".

Figure 3:
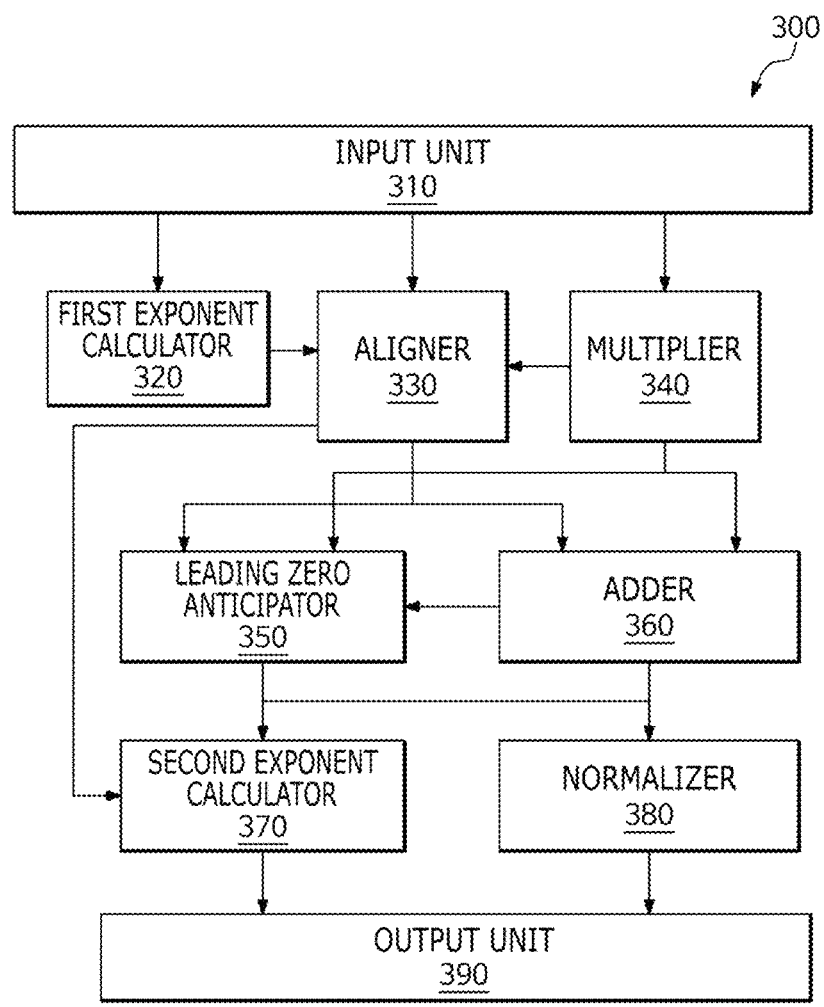
FIG. 3 is a diagram illustrating a detailed structure of an operator.

FIG. 3 is a diagram illustrating a detailed structure of an operator 300. The operator 300 may be configured to perform an addition operation, a multiplication operation, and/or a floating-point Multiply-and-Add (FMA) operation, etc. The operator 300 may include an input unit 310, a first exponent calculator 320, an aligner 330, a multiplier 340, and a leading zero anticipator (LZA), an adder 360, a second exponent calculator 370, a normalizer 380, and an output unit 390.

The input unit 310 and the output unit 390 of FIG. 3 may correspond to the input unit 110 and the output unit 130 of FIG. 1, respectively. The input unit 310 may receive a first bit pattern of a first format associated with a first operand, a second bit pattern of a second format associated with a second operand, and a third bit pattern of a third format associated with a third operand. In the description provided below with reference to FIG. 3, it will be described that the multiplication is performed in the multiplier 340 using the first bit pattern and the second bit pattern, and the addition operation is performed in the adder 360 using the third bit pattern associated with the third operand.

The first format may be the integer representation format or the floating point representation format, and the second format and the third format may be the floating point representation format. If the first format is the integer representation format, the number of bits of the first bit pattern may be less than the number of bits of the second bit pattern.

The input unit 310 may transmit the first bit pattern, the second bit pattern, and the third bit pattern to the first exponent calculator 320, the aligner 330, the multiplier 340, etc. The input unit 310 may transmit the entire bit pattern to the first exponent calculator 320, the aligner 330, the multiplier 340, or may transmit a part of the bit pattern (e.g., an exponent field or a mantissa field of the bit pattern) required by the first exponent calculator 320, the aligner 330, the multiplier 340, etc. That is, if operation and processing are performed in each of the first exponent calculator 320, the aligner 330, and the multiplier 340 using a part of a specific bit pattern, each of the first exponent calculator 320, the aligner 330, and the multiplier 340 may receive the part of the specific bit pattern from the input unit 310 to perform the operation and processing, or may receive an entire bit pattern and separate the part of the specific bit pattern to perform the operation and processing.

The first exponent calculator 320 may calculate an exponent of a result value of the multiplication between the operands based on the exponent field of each bit pattern on which the binary multiplication operation is performed. For example, if the multiplication operation is performed between the first operand and the second operand, and the first format and the second format are floating point representation formats, the first exponent calculator 320 may calculate a sum of the exponent of the first operand and the exponent of the second operand based on the exponent field of the first bit pattern and the exponent field of the second bit pattern. Based on the calculated sum of exponents, the aligner 330 may perform an exponent alignment between the mantissa field of the third bit pattern, and the fourth bit pattern including binary multiplication operation result information of the mantissa field of the first bit pattern and the mantissa field of the second bit pattern.

Alternatively, if one of the first format or the second format is the integer representation format, it is not necessary to sum the exponents of the operand as described below, and accordingly, the first exponent calculator 320 may be omitted from the operator 300. That is, the first exponent calculator 320 may be omitted from the operator 300 structure that calculates the multiplication result of the operands based on the bit pattern of the integer representation format and the bit pattern of the floating point representation format, thereby reducing the hardware resources required by the operator 300 for operation.

The aligner 330 may determine whether to perform the shift for the exponent alignment of the bit pattern, based on the exponent of the operand or the exponent field associated with the operand. In response to determining to perform the shift, the aligner 330 may perform the position move or shift of the mantissa field such that the exponent of a specific operand matches the exponent of another operand. For example, if the exponents of two operands are different from each other, the aligner 330 may perform the exponent alignment by shifting the mantissa of the operand having a smaller exponent to the right. Additionally or alternatively, if the exponents of the two operands are different from each other, the aligner 330 may perform an exponent alignment by shifting the mantissa of the operand having a larger exponent to the left.

If the first bit pattern, the second bit pattern, and the third bit pattern are in the floating point representation format and include the exponent field and the mantissa field, respectively, in response to determining that the sum of the exponents of the first operand and the second operand calculated by the first exponent calculator 320 is different from the exponent of the third operand, the aligner 330 may perform the exponent alignment by performing the shift operation on at least one of the mantissa field of the third bit pattern or the fourth bit pattern including information corresponding to a binary multiplication result of the mantissa field of the first bit pattern and the mantissa field of the second bit pattern.

Alternatively, if the first bit pattern is in the integer representation format, the aligner 330 may perform the exponent alignment by performing the shift operation on the mantissa field of the third bit pattern based on the difference between the value of the exponent field of the second bit pattern and the value of the exponent field of the third bit pattern.

The shift operation performed by the aligner 330 may include a first shift for exponent alignment, and a second shift performed based on the third bit pattern to prevent a loss of operation accuracy due to bit truncation of the third bit pattern. The second shift may be performed only when the first bit pattern or the second bit pattern is the integer representation type. This will be described in detail below with reference to FIGS. 8 to 10.

The multiplier 340 may output a fourth bit pattern associated with a product of the first operand and the second operand.

Among the factors of the multiplier 340, a factor associated with the first operand may be determined based on the first format. For example, in response to the first format being the integer representation format, the factor associated with the first operand may be determined to be the first bit pattern.

Alternatively, in response to the first format being the floating point representation format and the first bit pattern including the exponent field and the mantissa field, a factor associated with the first operand may be determined to be the mantissa field of the first bit pattern.

Information on the first format for determining the factor associated with the first operand may be separately input to the multiplier 340, or whether to interpret a specific bit pattern in the integer representation format or the floating point representation format may be determined according to a mode setting of a separately provided mode switch.

In the multiplier 340, the maximum allowed number of bits of processable factors may be set, and in response to the sum of the number of bits of a plurality of factors to be processed in the multiplier 340 being within the maximum allowed number of bits, the multiplier 340 may perform a plurality of multiplication operations associated with the plurality of factors in parallel. In this case, the plurality of factors for parallel processing have the sum of the number of bits within the maximum allowed number of bits, and thus may be input to the multiplier 340 through the same input port. Through this, the operation performance of the multiplier 340 or the operator 300 can be improved.

For example, if the maximum allowed number of bits of the processable factors is 16 bits and the first and second formats are floating point representation formats including 10-bit mantissa field, the multiplier 340 may not perform parallel processing of the operations other than the operation using the first bit pattern and the second bit pattern.

On the other hand, if the first format is an 8-bit integer representation format, the multiplier 340 may perform the multiplication operation using the bit patterns of the 8-bit integer representation format in parallel with the operation using the first bit pattern and the second bit pattern.

The fourth bit pattern output from the multiplier 340 may include information corresponding to a binary multiplication result of the mantissa field of the first bit pattern and the second bit pattern. For example, if the first bit pattern in the integer representation format is 00000101, and the mantissa field of the second bit pattern in the floating point representation format is 1000011101 (including the implicit bit), the fourth bit pattern may include 00000101010010001 bit pattern. A product of the first operand $101_{(2)}$ and the mantissa $1000011101_{(2)}$ of the second operand may be determined to be $101.010010001_{(2)}$ based on the fourth bit pattern.

A leading zero anticipator 350 may determine, in a specific bit pattern, a position where 0 appears for the first time and/or a position where 1 appears for the first time from the most significant bit of the bit pattern. For example, the leading zero anticipator 350 may count the number of opposite bits from the most significant bit of the bit pattern until a bit value to determine a position appears, so as to determine a position where 0 appears for the first time and/or a position where 1 appears for the first time from the most significant bit.

The adder 360 may output a fifth bit pattern associated with a value obtained by adding the third operand to the product of the first operand and the second operand, based on the third bit pattern and the fourth bit pattern output from the multiplier 340. For example, the fifth bit pattern may be calculated by the binary addition of the fourth bit pattern and the mantissa field of the third bit pattern for which the shift operation is performed by the aligner 330.

With respect to the fifth bit pattern output from the adder 360, the leading zero anticipator 350 may determine a position on the fifth bit pattern where 1 occurs for the first time from the most significant bit.

The second exponent calculator 370 and the normalizer 380 may determine a sixth bit pattern associated with the final operation result output from the output unit 390. For example, the exponent field of the sixth bit pattern may be determined using the second exponent calculator 370, and the mantissa field of the sixth bit pattern may be determined using the normalizer 380.

The second exponent calculator 370 may determine the exponent field of the sixth bit pattern based on the position on the fifth bit pattern determined from the leading zero anticipator 350. The second exponent calculator 370 may determine the exponent field of the sixth bit pattern based on the first '1' position on the fifth bit pattern determined by the leading zero anticipator 350, the most significant bit position of the mantissa field of the second bit pattern, and the exponent field of the second bit pattern. For example, the second exponent calculator 370 may determine the exponent field of the sixth bit pattern by summing the exponent field of the second bit pattern with the difference between the first '1' position on the fifth bit pattern and the most significant bit position of the mantissa field of the second bit pattern.

The normalizer 380 may perform the shift operation based on the position on the fifth bit pattern determined from the leading zero anticipator 350. The normalizer 380 may determine the mantissa field of the sixth bit pattern by truncating or rounding bits other than a predetermined number of bits in the fifth bit pattern that is shifted.

For example, the mantissa field of the sixth bit pattern may be set to have a predetermined number of bits, and the normalizer 380 may perform the shift operation such that the first '1' position on the fifth bit pattern determined by the leading zero anticipator 350 is moved the predetermined number of bits from the least significant bit. As the shift operation is performed, the normalizer 380 may determine the mantissa field of the sixth bit pattern by truncating or rounding the bits exceeding the least significant bit.

The internal configuration of the operator 300 illustrated in FIG. 3 is merely an example, and in some aspects, configuration (e.g., separate memory) other than the illustrated internal configuration may be additionally included, or some configurations and/or connection relationships between the configurations may be added or omitted.

Although FIG. 3 illustrates and describes the internal configuration of the operator 300 on the basis of each function, this is for the purpose of facilitating understanding of the disclosure and does not necessarily mean that they are physically separated, and the process/action/operation described as being performed by a specific configuration in the operator 300 may be performed in other configurations. For example, the normalizer 380 may replace the second exponent calculator 370 to additionally determine the exponent field of the sixth bit pattern based on the number of bits shifted and the exponent field of the second bit pattern.

In addition, it should be understood that the processes that can be performed by the operator 300 or the sub-block configurations illustrated in the operator 300 are not limited to those described above, and that the processes performed by each block of a typical floating point unit (FPU) may be performed as well.

Figure 4:
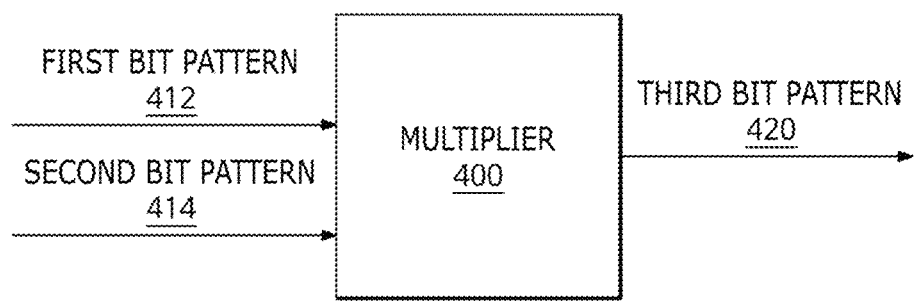
FIG. 4 is a diagram illustrating input and output data of the multiplier.

FIG. 4 is a diagram illustrating input and output data of the multiplier 400. The multiplier 400 may receive a first bit pattern 412 of the first format associated with the first operand and a second bit pattern 414 of the second format associated with the second operand and output a third bit pattern 420 associated with a product of the first operand and the second operand.

The first format may be the integer representation format or the floating point representation format, and the second format may be the floating point representation format. The number of bits of the bit pattern according to the first format may be less than the number of bits of the bit pattern according to the second format.

Since the second format corresponds to the floating point representation format, the second bit pattern 414 may include the exponent field and the mantissa field. In response to the first format being the integer representation format, the third bit pattern 420 may include information corresponding to a binary multiplication result of the mantissa field of the first bit pattern 412 and the second bit pattern 414.

Alternatively, in response to the first format being the floating point representation format, the third bit pattern 420 may include information corresponding to a binary multiplication result of the mantissa field of the first bit pattern 412 and the mantissa field of the second bit pattern 414.

Information on whether the first format corresponds to the integer representation format or the floating point representation format may be input to the multiplier 400 together, or the representation format to interpret a specific input bit pattern may be determined according to a mode setting value of a mode switch provided in association with the multiplier 400.

Figure 5:
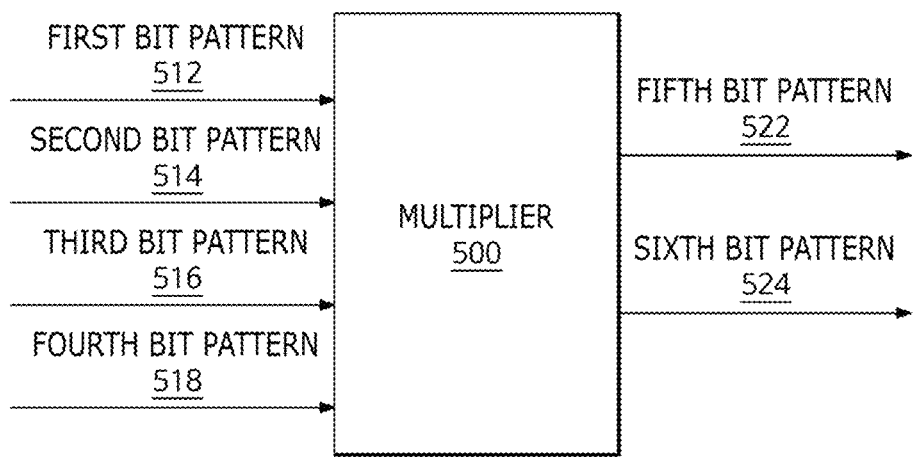
FIG. 5 is a diagram illustrating input and output data of a multiplier capable of performing a plurality of multiplication operations in parallel.

FIG. 5 is a diagram illustrating input and output data of a multiplier 500 capable of performing a plurality of multiplication operations in parallel. The multiplier 500 may receive a first bit pattern 512 of a first format associated with a first operand, a second bit pattern 514 of a second format associated with a second operand, a third bit pattern 516 of a third format associated with a third operand, and a fourth bit pattern 518 of a fourth format associated with a fourth operand, and output a fifth bit pattern 522 associated with the product of the first and second operands and a sixth bit pattern 524 associated with the product of the third and fourth operands.

In the multiplier 500, the maximum allowed number of bits of processable factors may be set, and in response to the sum of the number of bits of a plurality of factors to be processed in the multiplier 500 being within the maximum allowed number of bits, the multiplier 500 may perform a plurality of multiplication operations associated with the plurality of factors in parallel. In this case, the plurality of factors for parallel processing have the sum of the number of bits within the maximum allowed number of bits, and thus may be input to the multiplier 500 through the same input port. Through this, the operation performance of the multiplier 500 or the operator including the multiplier 500 can be improved.

For example, if the maximum allowed number of bits of the processable factors is 16 bits and the first and second formats are floating point representation formats including 10-bit mantissa field, the multiplier 500 may not perform parallel processing of the operations other than the operation using the first bit pattern 512 and the second bit pattern 514.

Alternatively, if the first format and the third format are the 8-bit integer representation format and the second format is a floating point representation format including a 10-bit mantissa field, an operation of calculating the fifth bit pattern 522 using the first bit pattern 512 and the second bit pattern 514 and a multiplication operation of calculating the sixth bit pattern 524 using the third bit pattern 516 and the fourth bit pattern 518 may be performed in parallel in the multiplier 500.

The bit patterns 412, 414, 512, 514, 516, and 518 input to the multipliers 400 and 500 illustrated in FIGS. 4 and 5 may be entire or part of the bit pattern representing the operand. For example, if multiplication operation using the mantissa field of a specific bit pattern is performed in the multipliers 400 and 500, the multiplier 400 may receive only the previously separated mantissa field data to perform the multiplication operation, or receive the entire bit pattern and separate the mantissa field to perform the multiplication operation.

Figure 6:
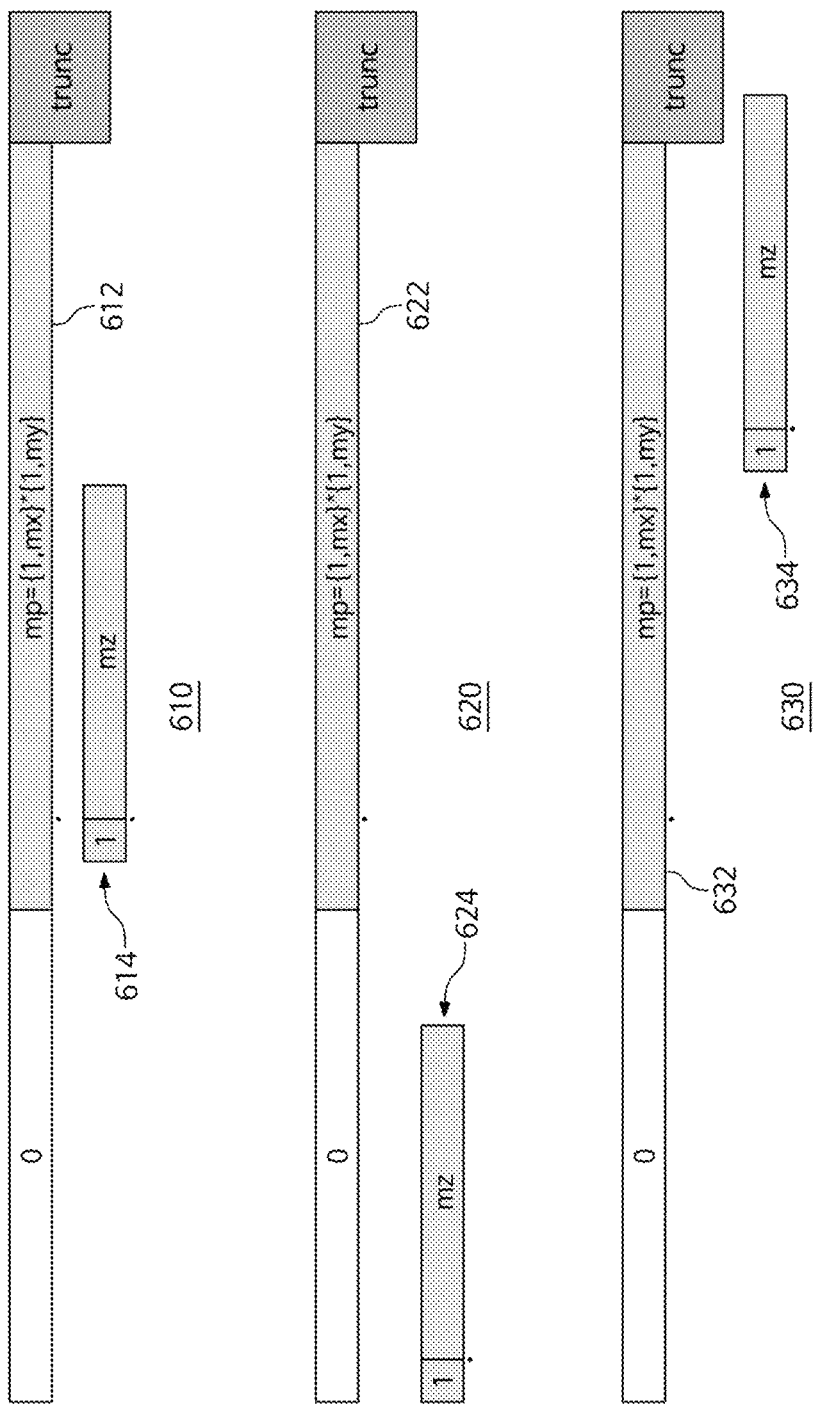
FIG. 6 is a diagram illustrating an example of an exponent alignment between bit patterns.

FIG. 6 is a diagram illustrating an example of an exponent alignment between bit patterns. Before performing operations between operands, the position move or shift of the bit pattern may be performed such that the exponent of a specific operand matches the exponent of another operand, based on the exponent of the operand or the exponent field associated with the operand. For example, if the exponents of the two operands are different from each other, the exponent alignment may be performed by shifting the bit pattern (e.g., mantissa field) associated with the operand with the smaller exponent to the right. Aspects are not limited to the above, and the exponent alignment may be performed by shifting the bit pattern associated with the operand having a larger exponent to the left, or shifting the two operands in opposite directions at the same time.

In the examples 610, 620, and 630 illustrated in FIG. 6, $\{1, mx\}$ and $\{1, my\}$ each represent a mantissa field including an implicit bit, $mp=\{1, mx\}*\{1, my\}$ represents a bit pattern representing a result of performing a binary multiplication operation between the mantissa fields, and mz represents the mantissa field excluding an implicit bit, and the implicit bit (1) associated with mz is separately shown. That is, the examples 610, 620, and 630 illustrated in FIG. 6 illustrate examples in which the exponent alignment is performed when performing operations (e.g., Multiply-and-Add (FMA) operations) using operands represented in the floating point representation format.

The first example 610 may illustrate an example in which an exponent of an operand associated with a first bit pattern 612 and an operand associated with a second bit pattern 614 (addend) match, so it is not necessary to shift the second bit pattern 614. In the first example 610, it can be seen that a decimal point associated with the first bit pattern 612 and a decimal point associated with the second bit pattern 614 coincide with each other.

The second example 620 may be an example in which an exponent of an operand associated with a fourth bit pattern 624 is greater than an exponent of an operand associated with a third bit pattern 622, so left-shift is performed on the fourth bit pattern 624.

The third example 630 may be an example in which an exponent of an operand associated with a sixth bit pattern 634 is smaller than an exponent of an operand associated with a fifth bit pattern 632, so right-shift is performed on the sixth bit pattern 634. In this case, part of the sixth bit pattern 634 is truncated because it is in a range for truncation (simply, "trunc"), and in this case, an error may occur in calculating the final operation result.

Figure 7:
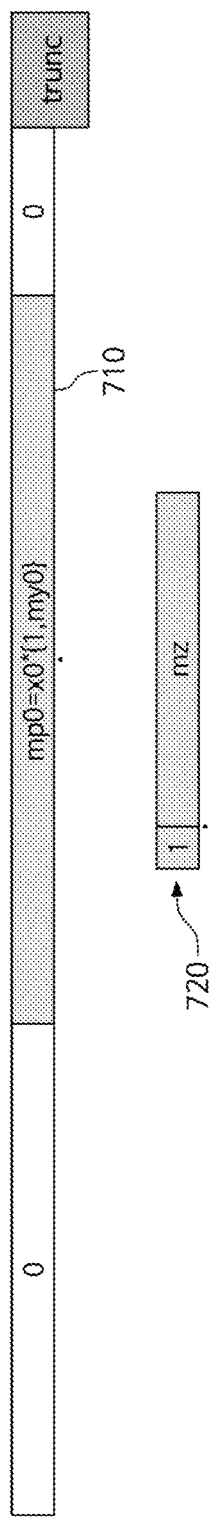
FIG. 7 is a diagram illustrating an example of an exponent alignment between bit patterns according to another aspect of the present disclosure.

FIG. 7 is a diagram illustrating an example of an exponent alignment between bit patterns according to another aspect of the present disclosure.

In the example illustrated in FIG. 7, x0 of a first bit pattern 710 may represent a bit pattern in the integer representation format, $\{1, my0\}$ may represent a mantissa field including an implicit bit, $mp=x0*\{1, my0\}$ may represent a bit pattern showing the result of performing a binary multiplication operation of the bit pattern in the integer representation format and a mantissa field, and mz of a second bit pattern 720 may represent the mantissa field excluding the implicit bit, and the implicit bit (1) associated with mz is separately shown. That is, the example illustrated in FIG. 7 illustrates an example in which the binary multiplication operation is performed using the operand represented in the floating point representation format and the operand represented in the integer representation format, and the exponent alignment is performed with the result value.

x0 may be in the integer representation format having fewer bits than $\{1, my0\}$. For example, x0 may be an INT8-type bit pattern, and $\{1, my0\}$ may be a mantissa field of an FP16-type bit pattern. Through this, if the binary multiplication of x0 and $\{1, my0\}$ is performed, the bit-width of the result value may be reduced compared to the case of performing binary multiplication between mantissa fields of the FP16 format bit pattern, and the operation may be performed using a multiplier and/or an adder that processes a smaller bit width.

Figure 8:
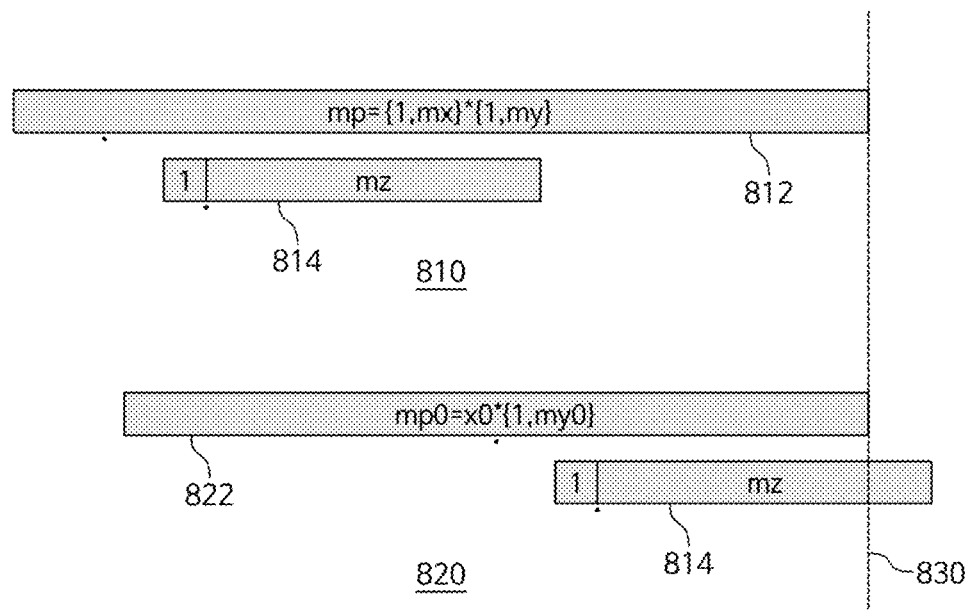
FIG. 8 is a diagram illustrating an example in which the same bit pattern is exponent aligned with respect to different bit patterns.

FIG. 8 is a diagram illustrating an example in which the same bit pattern 814 is exponent aligned with respect to different bit patterns 812 and 822. A first bit pattern 812 may correspond to the first bit pattern 612 of FIG. 6, etc., a second bit pattern 822 may correspond to the first bit pattern 710 of FIG. 7, and the redundant description of the corresponding configuration will be omitted.

If the first bit pattern 812 indicating the result of performing binary multiplication between mantissa fields, and the second bit pattern 822 indicating the result of performing binary multiplication of bit pattern of integer representation type and mantissa field are aligned on the same reference line 830, a decimal point of the multiplication result value of the second bit pattern 822 may be located further on the right side. This is because the bit pattern of integer representation type does not include bits below the decimal point.

Accordingly, as a result of the exponent alignment of the third bit pattern 814 with respect to each of the first bit pattern 812 and the second bit pattern 822, the third bit pattern 814 in a second example 820 may be located further on the right side than in the first example 810. Accordingly, although the exponent alignment is performed using the same third bit pattern 814 in both the first and second examples 810 and 820, and truncation may be performed on some bits of the third bit pattern 814 that deviates from the reference line 830 in the second example 820. In other words, when the binary operation is performed between the operand in the floating point representation format and the operand in the integer representation format, truncation may be performed more frequently than when the binary operation is performed between operands in the floating point representation format, resulting in a decrease in the accuracy of the operation.

Therefore, in order to reduce the frequency of truncations of the third bit pattern 814, left-shift operation may be performed in advance on the second bit pattern 822, and the third bit pattern 814 may be exponent aligned to correspond to the left-shifted second bit pattern 822. This will be described in detail below with reference to FIGS. 9 and 10.

Figure 9:
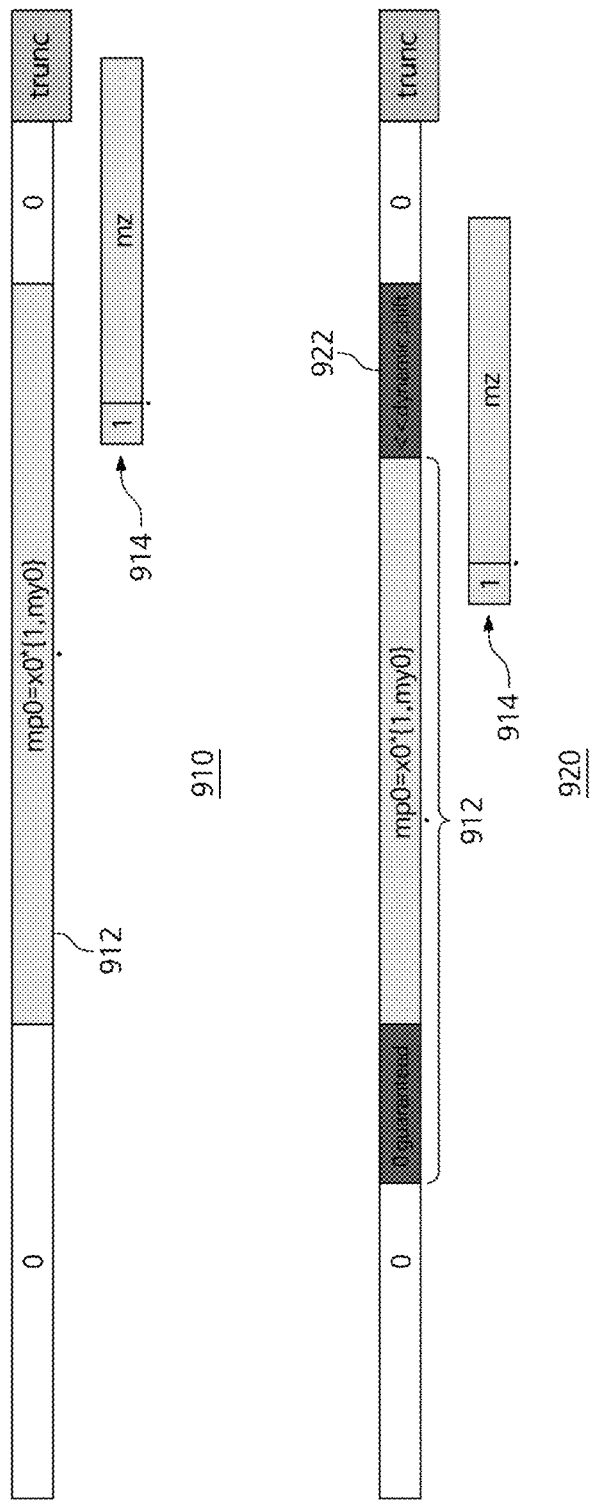
FIG. 9 is a diagram illustrating an example in which a dynamic bit shift is performed.

FIG. 9 is a diagram illustrating an example in which a dynamic bit shift 922 is performed. Specifically, a first example 910 illustrates an example in which dynamic bit shift is not performed on a first bit pattern 912 and a second bit pattern 914, and a second example 920 illustrates an example in which dynamic bit shift 922 is performed.

In order to solve the problem that the accuracy of the binary operation may be reduced by the truncation described in FIG. 8, the dynamic bit shift 922 may be performed together with the shift for exponent alignment of the first bit pattern 912 associated with the first operand and the second bit pattern 914 associated with the second operand. Meanwhile, the shift for exponent alignment may be performed in the aligner on at least one of the first bit pattern 912 and the second bit pattern 914, in response to determining whether to perform the shift for exponent alignment of the first bit pattern 912 and the second bit pattern 914. The shift for exponent alignment may optionally be performed, the dynamic bit shift 922 may be performed, and the binary operation of the first bit pattern 912 and second bit pattern 914 may be performed.

The dynamic bit shift 922 may correspond to the left-shift. The dynamic bit shift 922 may be performed to move a position by the same number of bits with respect to the first bit pattern 912 and the second bit pattern 914.

The first bit pattern 912 may include information corresponding to a binary multiplication result of the third bit pattern associated with the third operand (indicated by "x0') and the mantissa field of the fourth bit pattern associated with the fourth operand (indicated by "{1, my0}"). In this case, the third bit pattern may be a bit pattern representing the third operand in the integer representation format, and the fourth bit pattern may be a bit pattern representing the fourth operand in the floating point representation format. In addition, the second bit pattern 914 may be a mantissa field (indicated by "mz') of a bit pattern representing the second operand in the floating point representation format.

The number of bits by which the dynamic bit shift 922 is performed may be determined based on the third bit pattern x0. The dynamic bit shift 922 may be performed by the number of bits that are guaranteed to be '0' bits ('0 guaranteed') in the first bit pattern 912 based on the third bit pattern, so that the number of "0" bits may remain the same even if the dynamic bit shift 922 is performed. This will be described in detail below with reference to FIG. 10.

Using a truncate or rounding operation, a bit representing a number less than or equal to a predetermined threshold value may be removed from the first bit pattern 912 and the second bit pattern 914 on which the dynamic bit shift 922 was performed. For example, in the first example 910, some bits positioned in the truncate range (indicated by "trunc') may be removed from the second bit pattern 914.

On the other hand, in the second example 920, as a result of performing the dynamic bit shift 922, truncation may not be performed, thereby increasing the accuracy of the operation.

A fifth bit pattern that is a binary operation result of the first bit pattern 912 and the second bit pattern 914 may be determined, and a sixth bit pattern associated with a final operation result of the first operand and the second operand may be determined based on the fifth bit pattern.

Although it is illustrated and described that the dynamic bit shift 922 is performed when the third bit pattern is in the integer representation format, aspects are not limited thereto, it may be used for operations between bit patterns of any format to improve the accuracy of the operation by reducing the frequency of truncations.

FIG. 10 is a diagram illustrating an example in which the number of bits of dynamic bit shift is determined based on a bit pattern.

As described in FIG. 9, the number of bits by which the dynamic bit shift is performed may be determined based on the third bit pattern x0 of FIG. 9, and the like elements or operations already described above with respect to the third bit pattern in FIG. 9 will not be repeated. Although FIG. 10 illustrates a bit pattern in the INT8 integer representation format by 2's complement as various examples 1010, 1020, 1030, 1040, 1040, 1060, and 1070 of the third bit pattern of FIG. 9, aspects are not limited to this format.

In addition, although FIG. 10 illustrates only an example of the third bit pattern in which the most significant bit corresponds to a "0", aspects are not limited thereto, and the most significant bit of the third bit pattern may be "1" (i.e., representing a negative value according to the 2's complement representation), and in response, the 1's complement of the third bit pattern may be taken and then the number of bits of the dynamic bit shift may be determined based on the same.

The number of bits by which dynamic bit shift is performed may be determined based on a position on the third bit pattern in which the opposite bit of the most significant bit occurs for the first time from the most significant bit of the third bit pattern. For example, as the position on the third bit pattern in which the opposite bit of the most significant bit occurs for the first time from the most significant bit of the third bit pattern is farther away from the most significant bit, the number of bits by which the second shift is performed may increase. In FIG. 10, a value "mex0" indicates the number of bits by which dynamic bit shift is performed.

For example, in the first example 1010 of the third bit pattern, the position where the opposite bit "1" of the most significant bit occurs for the first time from the most significant bit "0" is the second bit from the most significant bit, so the dynamic bit shift may not be performed.

Alternatively, in the seventh example 1070, the position where the opposite bit of the most significant bit occurs for the first time from the most significant bit is the eighth position from the most significant bit, so the dynamic bit shift may be performed by 6 bits. That is, in the first example 1010 to the seventh example 1070, as the position where the opposite bit of the most significant bit occurs for the first time from the most significant bit sequentially increases, the number of bits by which dynamic bit shift is performed may sequentially increase.

That is, the smaller the value of the bit pattern of the integer representation type for the binary multiplication operation with the bit pattern of the floating-point representation type, the higher the frequency of occurrence of truncation when there is exponent alignment of the bit pattern including the result of the binary multiplication operation and any bit pattern. Accordingly, it may be set such that, as the absolute value represented by the third bit pattern decreases (or the greater the position where the opposite bit of the most significant bit occurs for the first time from the most significant bit), the number of bits by which the dynamic bit shift is performed is increased. Through this, the frequency of occurrence of truncation can be reduced, thereby improving the operation accuracy.

Figure 11:
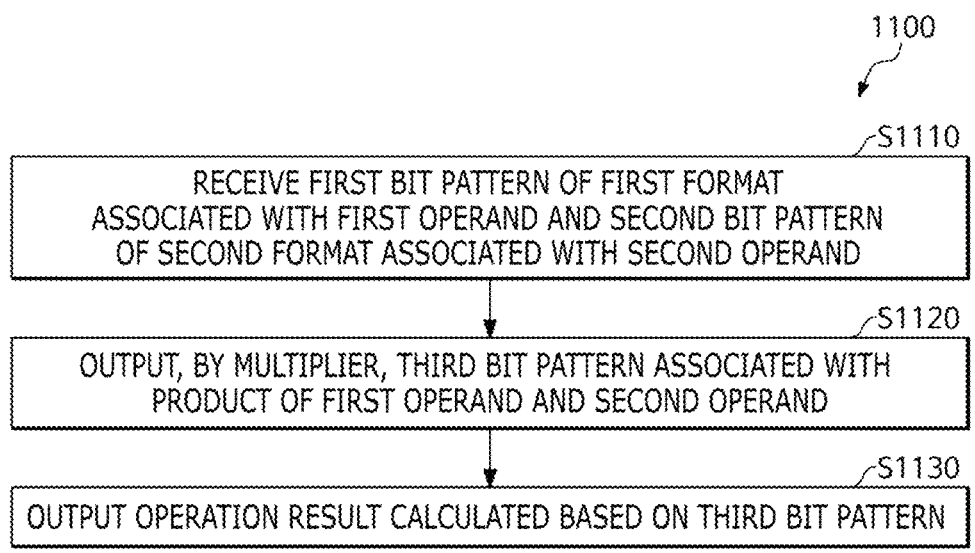
FIG. 11 is a flowchart provided to explain an operation method using heterogeneous format input.

FIG. 11 is a flowchart provided to explain an operation method 1100 using heterogeneous format input. The operation method 1100 may be performed by an operator including a multiplier.

The operation method 1100 may be initiated by the operator (or the input unit of the operator) receiving the first bit pattern of the first format associated with the first operand and the second bit pattern of the second format associated with the second operand, at S1110. The first format and the second format may be different from each other. For example, the first format may be the integer representation format, and the second format may be the floating point representation format. The number of bits of the first bit pattern may be less than the number of bits of the second bit pattern.

The operator may output the third bit pattern associated with the product of the first operand and the second operand obtained by the multiplier, at S1120. The second bit pattern may include the exponent field and the mantissa field, and the third bit pattern may include the information corresponding to a binary multiplication result of the first bit pattern and the mantissa field of the second bit pattern.

A factor associated with the first operand, which is input to the multiplier, may be determined based on the first format. For example, in response to the first format being the integer representation format, the factor associated with the first operand may be determined to be the first bit pattern, and in response to the first format being the floating point representation format and the first bit pattern including the exponent field and the mantissa field, the factor associated with the first operand may be determined to be the mantissa field of the first bit pattern.

In the multiplier, the maximum allowed number of bits of a processable factor may be set, and the multiplier may perform a plurality of multiplication operations associated with the plurality of factors in parallel in response to the sum of the number of bits of the plurality of factors to be processed by the multiplier being within the maximum allowed number of bits.

The operator (or the output unit of the operator) may output an operation result calculated based on the third bit pattern, at S1130. The operator may receive a fourth bit pattern of the second format associated with the third operand, output a fifth bit pattern associated with a value obtained by adding a value of the third operand to a product of the first operand and the second operand based on the third bit pattern and the fourth bit pattern, and output a calculated operation result based on the fifth bit pattern.

The second bit pattern may include the exponent field and the mantissa field, and in response to a determination that the exponent field of the second bit pattern and the exponent field of the fourth bit pattern are different from each other, the operator (or the aligner) may perform a shift operation on at least one of the mantissa field of the fourth bit pattern or the third bit pattern.

The operator (or the aligner) may perform the shift operation on the mantissa field of the fourth bit pattern based on a difference between the value of the exponent field of the second bit pattern and the value of the exponent field of the fourth bit pattern. The fifth bit pattern may be calculated by binary addition of the third bit pattern and the mantissa field of the fourth bit pattern that is shifted.

The operator (or the output unit) may output a sixth bit pattern associated with the operation result, which is determined based on the fifth bit pattern. In this case, the sixth bit pattern may include the exponent field and the mantissa field.

The operator (or the leading zero anticipator) may predict a position on the fifth bit pattern where 1 occurs for the first time from the most significant bit of the fifth bit pattern, and the exponent field of the sixth bit pattern may be determined based on the determined position on the fifth bit pattern. For example, the second bit pattern may include the exponent field and the mantissa field, and the exponent field of the sixth bit pattern may be determined based on the position on the fifth bit pattern determined by the leading zero anticipator, the most significant bit position of the mantissa field of the second bit pattern, and the exponent field of the second bit pattern.

Shift operation may be performed on the fifth bit pattern based on the determined position on the fifth bit pattern, and the operator (or the normalizer) may determine the mantissa field of the sixth bit pattern by truncating or rounding bits other than a predetermined number of bits in the fifth bit pattern that is shifted.

Figure 12:
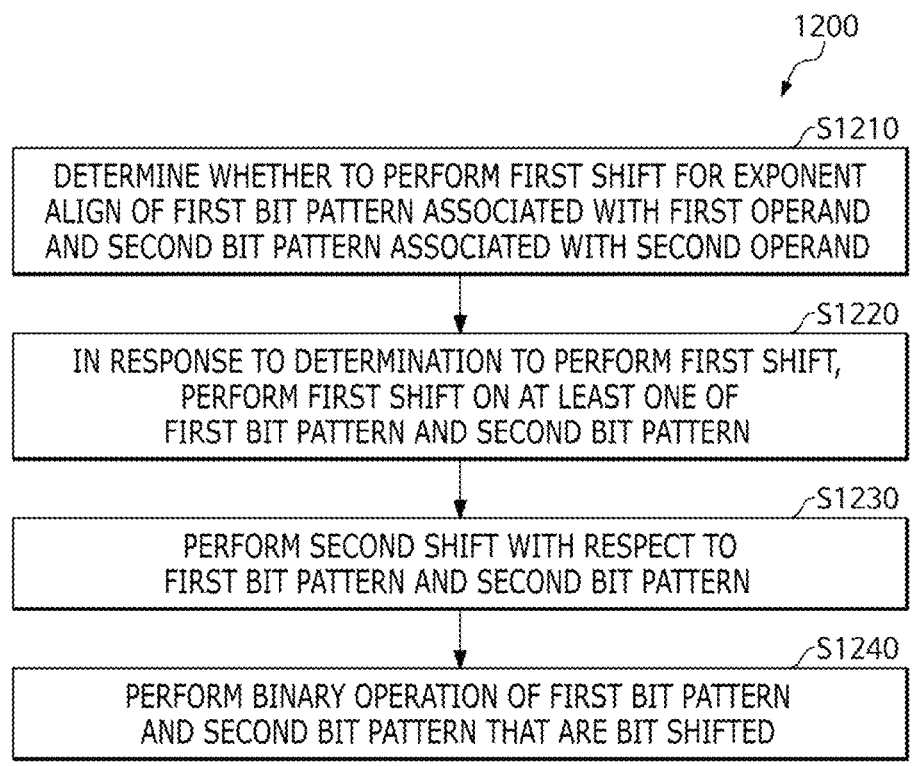
FIG. 12 is a flowchart provided to explain a bit pattern operation method using dynamic bit shift.

FIG. 12 is a flowchart provided to explain a bit pattern operation method 1200 using dynamic bit shift. The bit pattern operation method 1200 using dynamic bit shift may be performed by an operator.

The operation method 1200 may be initiated by the operator (or the aligner) determining whether or not to perform the first shift for exponent alignment of the first bit pattern associated with the first operand and the second bit pattern associated with the second operand, at S1210. The first bit pattern may include information corresponding to a binary multiplication result of the third bit pattern associated with the third operand and the mantissa field of the fourth bit pattern associated with the fourth operand, the third bit pattern may be a bit pattern representing the third operand in the integer representation format, and the fourth bit pattern may be a bit pattern representing the fourth operand in the floating point representation format. The second bit pattern may be a mantissa field of a bit pattern representing the second operand in the floating point representation format.

The operator (or the aligner) may perform the first shift on at least one of the first bit pattern and the second bit pattern in response to the determination to perform the first shift, at S1220.

The operator (or the aligner) may perform a second shift with respect to the first bit pattern and the second bit pattern, at S1230. The second shift may correspond to the left-shift.

The operator (or the aligner) may perform the second shift such that the position move is performed by the same number of bits for the first bit pattern and the second bit pattern.

The first bit pattern may include information corresponding to a binary multiplication result of the third bit pattern associated with the third operand and the mantissa field of the fourth bit pattern associated with the fourth operand, the third bit pattern may be a bit pattern representing the third operand in the integer representation format, and the number of bits by which the position move is performed may be determined based on the third bit pattern. For example, the number of bits by which the position move is performed may be determined based on a position on the third bit pattern where the opposite bit of the most significant bit occurs for the first time from the most significant bit of the third bit pattern. For example, the number of bits by which the second shift is performed may increase as the position on the third bit pattern is farther away from the most significant bit.

Using a truncated or rounding operation, the operator may remove a bit representing a number less than or equal to a predetermined threshold value from the first bit pattern and the second bit pattern that are bit shifted.

The operator (or the adder) may perform a binary operation of the first bit pattern and the second bit pattern that are bit shifted, at S1240. In this case, the bit shift may include the second shift, and may include the first shift in response to the determination to perform the first shift.

The operator may perform the binary operation by determining the fifth bit pattern that is the binary operation result of the first bit pattern and the second bit pattern, and determining a sixth bit pattern associated with a final operation result of the first operand and the second operand based on the fifth bit pattern. The sixth bit pattern may include the exponent field and the mantissa field.

The operator may predict a position on the fifth bit pattern where 1 occurs for the first time from the most significant bit of the fifth bit pattern, and determine the exponent field of the sixth bit pattern based on the position on the fifth bit pattern.

The operator may predict a position on the fifth bit pattern where 1 occurs for the first time from the most significant bit of the fifth bit pattern, perform a shift on the fifth bit pattern based on the determined position on the fifth bit pattern, and perform a rounding operation on the shifted fifth bit pattern to determine the mantissa field of the sixth bit pattern.

The flowcharts and the description described above with reference to FIGS. 11 and 12 are merely examples, and may be implemented differently in some aspects. For example, in some examples, the order of respective steps may be changed, some steps may be repeatedly performed, some steps may be omitted, or some steps may be added.

Hereinafter, circuits for implementing embodiments described above will be shown with reference to FIGS. 13 to 19.

Figure 13:
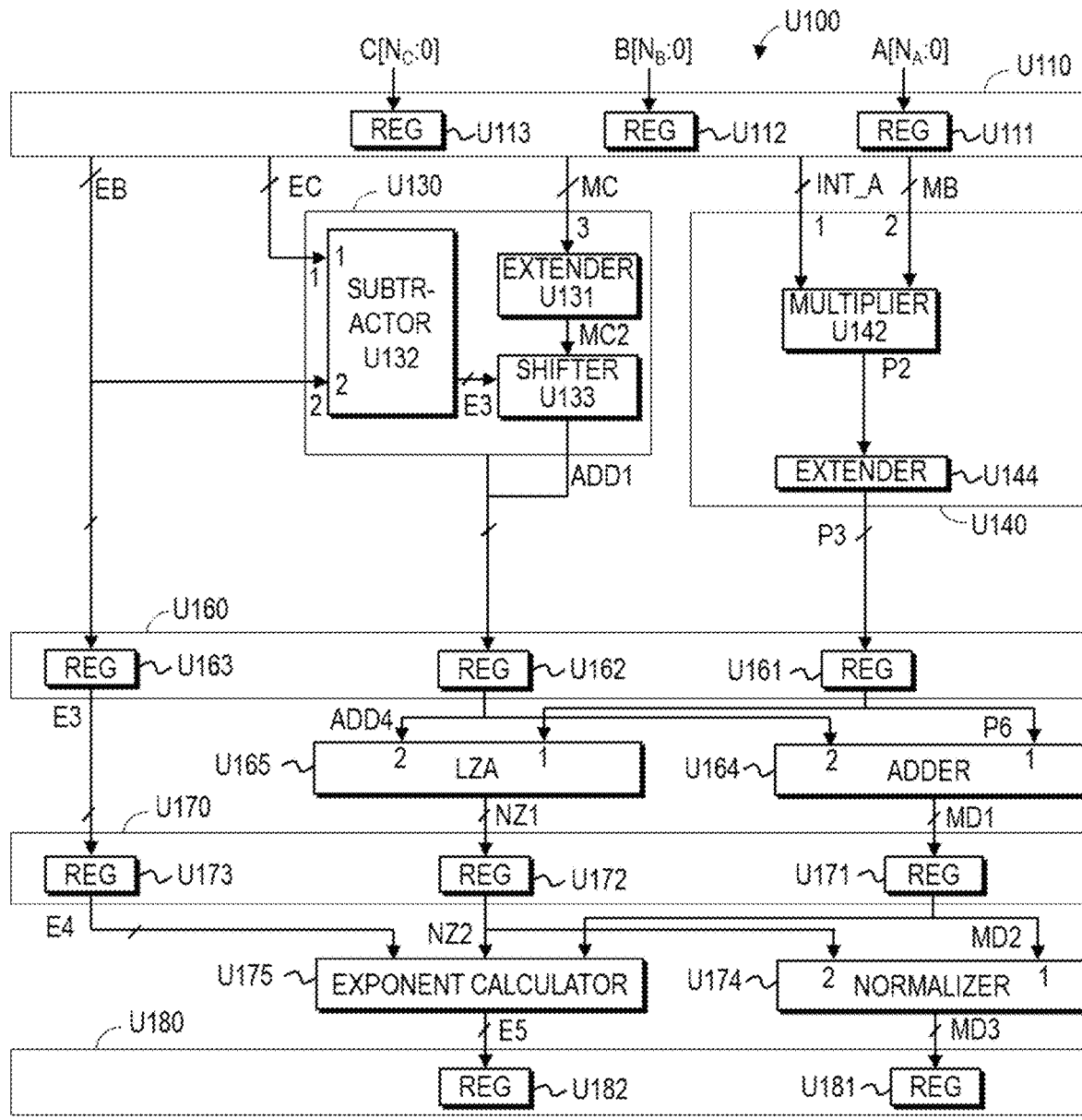
FIG. 13 shows a circuit diagram of a processor in accordance with an embodiment.

FIG. 13 shows a circuit diagram of a processor in accordance with an embodiment.

In particular, FIG. 13 shows a circuit diagram of a processor dedicated to calculating a product of an integer represented by an electronic logic signal A and a floating-point number represented by an electronic logic signal B and calculating a sum of the product and an addend represented by an electronic logic signal C without converting a format of an electronic logic signal A from an integer format to a floating-point number format to reduce hardware resources or components required for calculations.

As shown in FIG. 13, a processor U100 comprises input circuitry U110, aligner circuitry U130, multiplier circuitry U140, a register U161, a register U162, a register U163, adder circuitry U164, LZA circuitry U165, a register U171, a register U172, a register U173, a normalizer circuit U174, an exponent calculator circuit U175, and output circuitry U180.

The input circuitry U110 may receive and store an electronic logic signal $A[N_A-1:0]$, an electronic logic signal $B[N_B-1:0]$, and an electronic logic signal $C[N_C-1:0]$, where $N_A$ represents the number of bits in the electronic logic signal $A[N_A-1:0]$, $N_B$ represents the number of bits in the electronic logic signal $A[N_B-1:0]$, and $N_C$ represents the number of bits in the electronic logic signal $A[N_C-1:0]$. In some embodiments, $N_A=N_B=N_C$. For example, $N_A=N_B=N_C=16$. In some embodiments, $N_B=N_C$ and $N_A \neq N_B$. For example, $N_B=N_C=16$ and $N_A=N_B/2=8$.

The input circuitry U110 may comprise a plurality of one-bit registers for storing the electronic logic signal $A[N_A-1:0]$, the electronic logic signal $B[N_B-1:0]$, and the electronic logic signal $C[N_C-1:0]$. In some embodiments, for convenience, as shown in FIG. 13, the plurality of one-bit registers may be grouped into a register U111 storing the electronic logic signal $A[N_A-1:0]$, a register U112 storing the electronic logic signal $B[N_B-1:0]$, and a register U113 storing the electronic logic signal $C[N_C-1:0]$. Each of the plurality of one-bit registers has an input port and an output port. Each of the plurality of one-bit registers may store a one-bit electronic logic signal applied to the input port and output a stored one-bit electronic logic signal to the output port at each clock.

The register U111 may output an electronic logic signal INT_A representing an integer value of the electronic logic signal A. In some embodiments, $INT\_A=A[N_{INT}-1:0]$, where $N_{INT}$ is the number of bits representing an integer value. In some embodiments, when the electronic logic signal $A[N_A-1:0]$ represents an integer of the INT8 format, $N_{INT}$ may be equal to 8.

When the electronic logic signal $B[N_B-1:0]$ represents a floating-point number, the register U112 may output an electronic logic signal MB representing a mantissa of the electronic logic signal B, an electronic logic signal EB representing an exponent of the electronic logic signal B, and an electronic logic signal SB representing a sign of the electronic logic signal B. In some embodiments, $EB=B[N_E+N_M-1, N_M]$, $M_B=\{1, B[N_M-1:0]\}$, and $SB=B[N_E+N_M]$.

Calculation of a sign of a sum of the product of the electronic logic signals A and B and an addend represented by an electronic logic signal C is beyond this disclosure and will not be described. In some embodiments, the electronic logic signal INT_A may be set equal to the absolute value of A[NINT-1:0].

When the electronic logic signal $C[N_C-1:0]$ represents a floating-point number, the register U113 may output an electronic logic signal MC representing a mantissa of the electronic logic signal C, an electronic logic signal EC representing an exponent of the electronic logic signal C, and an electronic logic signal SC representing a sign of the electronic logic signal C. In some embodiments, $EC=C[N_E+N_M-1, N_M]$, $MC=\{1, C[N_M-1:0]\}$, and $SC=C[N_E+N_M]$.

The aligner circuitry U130 may have a first input port, a second input port, a third input port, and an output port. The electronic logic signal EC is applied to the first input port of the aligner circuitry U130. The electronic logic signal EB is applied to the second input port of the aligner circuitry U130. The electronic logic signal MC is applied to the third input port of the aligner circuitry U130. The electronic logic signal ADD1 representing an addend is output to the output port of the aligner circuitry U130. The second input port of the aligner circuitry U130 is electrically connected to the output port of the exponent calculator circuitry U120. The aligner circuitry U130 may align the electronic logic signal MC with an output signal of the multiplier circuitry U140 based on the electronic logic signal EC and the electronic logic signal EB to output an aligned electronic logic signal of the electronic logic signal MC.

In some embodiments, as shown in FIG. 13, the aligner circuitry U130 may comprise a bit extender circuit U131, a subtractor circuit U132, and a shifter circuit U133.

The bit extender circuit U131 may have a first input port and an output port. The electronic logic signal MC is applied to the first input port of the bit extender circuit U131. In some embodiments, the bit extender circuit U131 may transform the electronic logic signal MC into an extended electronic logic signal MC2 and output the extended electronic logic signal MC2 to the output port. The number of bits in the extended electronic logic signal MC2 is greater than the number of bits in the electronic logic signal MC. The bit extender circuit U131 may generate and output the extended electronic logic signal MC2 as shown in FIG. 14.

Figure 14:
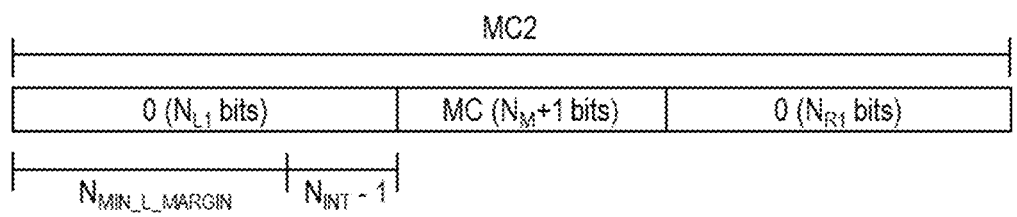
FIG. 14 shows an extended electronic logic signal representing a mantissa in accordance with an embodiment.

FIG. 14 shows an extended electronic logic signal representing a mantissa in accordance with an embodiment.

As shown in FIG. 14, $N_{L1}$ zero-value bits may be appended to the left of the electronic logic signal MC and $N_{R1}$ zero-value bits may be appended to the left of the electronic logic signal MC to output the extended electronic logic signal MC2 representing $N_T$ bits, where $N_{L1}(>0)$ represents the number of zero-value bits appended to the left of the electronic logic signal MC, $N_{R1}(>0)$ represents the number of zero-value bits appended to the right of the electronic logic signal MC, and $N_T(=N_L+N_M+1+N_R)$ represents the number of bits in the extended electronic logic signal. In some embodiments, $N_{L1}$ may be equal to $N_{MIN\_L\_MARGIN}+N_{INT}-1$, where $N_{MIN\_L\_MARGIN}$ represents the minimum number of zero-value bits appended to the left of the electronic logic signal MC required for avoiding truncation of data. ($N_{INT}-1$) zero-value bits may additionally be appended to the left of the electronic logic signal MC to align the electronic logic signal MC with a product of the electronic logic signal INT_A representing an integer and a mantissa of the electronic logic signal B. In some embodiments, $N_{MIN\_L\_MARGIN}$ may be less than ($N_{INT}+3$) or ($N_M+4$). For example, $N_T$ may be equal to 33 and $N_{MIN\_L\_MARGIN}$ may be equal to 11 when $N_{INT}$ is equal to 8 and $N_M$ is equal to 9.

Referring to FIG. 13 again, the subtractor circuit U132 may have a first input port, a second input port, and an output port. The electronic logic signal EC is applied to the first input port of the subtractor circuit U132 as a minuend. The electronic logic signal EB is applied to the second input port of the subtractor circuit U132 as a subtrahend. The electronic logic signal E3 is output to the output port of the subtractor circuit U132 as a difference between the minuend and the subtrahend. The first input port of the subtractor circuit U132 is electrically connected to the first input port of the aligner circuitry U130. The second input port of the subtractor circuit U132 is electrically connected to the second input port of the aligner circuitry U130. The subtractor circuit U132 may perform subtraction of a second electronic logic signal applied to the second input port from a first electronic logic signal applied to the first input port to output an electronic logic signal representing a difference between the first electronic logic signal and the second electronic logic signal. In some embodiments, the electronic logic signal E3 may represent a difference between an exponent of a product of the electronic logic signal A and the electronic logic signal B and an exponent of the electronic logic signal B.

The shifter circuit U133 may have a first input port, a second input port, and an output port. The electronic logic signal MC2 is applied to the first input port of the shifter circuit U133. The electronic logic signal E3 is applied to the second input port of the shifter circuit U133. An electronic logic signal ADD1 is output to the output port of the shifter circuit U133. The first input port of the shifter circuit U133 is electrically connected to the output port of the bit extender circuit U131. The second input port of the shifter circuit U133 is electrically connected to the output port of the subtractor circuit U132. The output port of the shifter circuit U133 is electrically connected to the output port of the aligner circuitry U130. The shifter circuit U133 may shift bits of an electronic logic signal applied to the first input port as determined by an electronic logic signal applied to the second input port to output a shifted electronic logic signal to the output port. In some embodiments, the shifter circuit U133 may be implemented by a Barrel shifter.

The multiplier circuitry U140 may have a first input port, a second input port, and an output port. The electronic logic signal INT_A is applied to the first input port. The electronic logic signal P2 is output to the output port. The multiplier circuitry U140 may perform multiplication of a first electronic logic signal applied to the first input port and a second electronic logic signal applied to the second input port to output an electronic logic signal representing a product of the first electronic logic signal and the second electronic logic signal to the output port.

In some embodiments, as shown in FIG. 13, the multiplier circuitry U140 may comprise a multiplier circuit U142 and a bit extender circuit U144.

The multiplier circuit U142 may have a first input port, a second input port, and an output port. The electronic logic signal INT_A is applied to the first input port of the multiplier circuit U142. The electronic logic signal MB is applied to the second input port of the multiplier circuit U142. The electronic logic signal P2 representing a product of the electronic logic signal INT_A and the electronic logic signal MB is output to the output port of the multiplier circuit U142. The first input port of the multiplier circuit U142 is electrically connected to the first input port of the multiplier circuitry U140. The second input port of the multiplier circuit U142 is electrically connected to the second input port of the multiplier circuitry U140. The multiplier circuit U142 may perform multiplication of NINT bits in a first electronic logic signal applied to the first input port and ($N_M+1$) bits in a second electronic logic signal applied to the second input port to output an electronic logic signal including ($N_{INT}$+$N_M$+1) bits representing a product of the first electronic logic signal and the second electronic logic signal to the output port.

The bit extender circuit U144 may have an input port and an output port. The electronic logic signal P2 is applied to the input port of the bit extender circuit U144. The electronic logic signal P3 is output to the output port of the bit extender circuit U144. The input port of the bit extender circuit U144 is electrically connected to the output port of the multiplier circuit U142. The output port of the bit extender circuit U144 is electrically connected to the output port of the multiplier circuitry U140. In some embodiments, the bit extender circuit U144 may transform the electronic logic signal P2 into an extended electronic logic signal P3 and output the extended electronic logic signal P3 to the output port. The number of bits in the extended electronic logic signal P3 is greater than the number of bits in the electronic logic signal P2. The bit extender circuit U144 may generate and output the extended electronic logic signal P3 as shown in FIG. 15.

Figure 15:
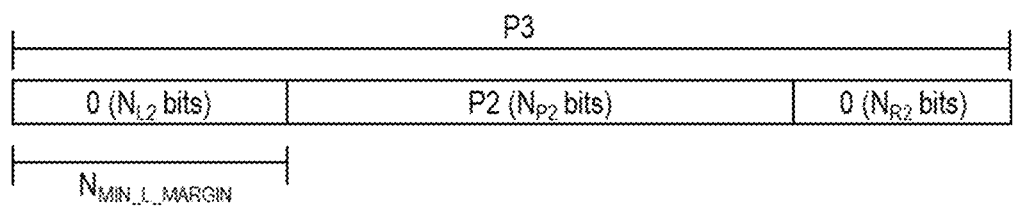
FIG. 15 shows an extended electronic logic signal representing a product in accordance with an embodiment.

FIG. 15 shows an extended electronic logic signal representing a product in accordance with an embodiment.

As shown in FIG. 15, $N_{L2}$ zero-value bits may be appended to the left of the electronic logic signal P2 and $N_{R2}$ zero-value bits may be appended to the left of the electronic logic signal P2 to output the extended electronic logic signal P3 representing $N_T(=N_{L2}+N_{P2}+N_{R2})$ bits, where $N_{L2}(>0)$ represents the number of zero-value bits appended to the left of the electronic logic signal P2, $N_{R2}(>0)$ represents the number of zero-value bits appended to the right of the electronic logic signal P2, and $N_T$ represents the number of bits in the extended electronic logic signal. In some embodiments, $N_{L2}$ may be equal to $N_{MIN\_L\_MARGIN}$. In some embodiments, $N_{P2}$ may be equal to $(N_M+1+N_{INT})$, when the electronic logic signal P2 represents a product of an integer represented by the electronic logic signal INT_A and a mantissa of the electronic logic signal B. In some embodiments, $N_{P2}$ may be equal to $(N_M+1) \times 2$, when the electronic logic signal P2 represents a product of a mantissa of the electronic logic signal A and a mantissa of the electronic logic signal B.

Referring to FIG. 13 again, the register U160 may receive and store the electronic logic signal P3, the electronic logic signal ADD1, and the electronic logic signal EB. In some embodiments, the register U160 may comprise a plurality of one-bit registers for storing the electronic logic signal P3, the electronic logic signal ADD1, and the electronic logic signal EB. In some embodiments, for convenience, the plurality of one-bit registers may be grouped into a register U161 storing the electronic logic signal P3, a register U162 storing the electronic logic signal ADD1, and a register U163 storing the electronic logic signal EB.

The register U161 may have an input port and an output port. The electronic logic signal P3 is applied to the input port of the register U161. The electronic logic signal P6 is output to the output port of the register U161. The input port of the register U161 is electrically connected to the output port of the multiplier circuitry U140. The register U161 may store an electronic logic signal applied to the input port and output a stored electronic logic signal to the output port at each clock.

The register U162 may have an input port and an output port. The electronic logic signal ADD1 is applied to the input port of the register U162. The electronic logic signal ADD4 representing a final addend is output to the output port of the register U162. The input port of the register U162 is electrically connected to the output port of the aligner circuitry U130. The register U162 may store an electronic logic signal applied to the input port and output a stored electronic logic signal to the output port at each clock.

The register U163 may have an input port and an output port. The electronic logic signal EB is applied to the input port of the register U163. The electronic logic signal E3 is output to the output port of the register U163. The input port of the register U163 is electrically connected to the output port of the multiplexer circuit U122. The register U163 may store an electronic logic signal applied to the input port and output a stored electronic logic signal to the output port at each clock.

The adder circuitry U164 may have a first input port, a second input port, and an output port. The electronic logic signal P6 is applied to the first input port of the adder circuitry U164. The electronic logic signal ADD4 is applied to the second input port of the adder circuitry U164. The electronic logic signal MD1 is output to the output port of the adder circuitry U164. The first input port is electrically connected to the output port of the register U161. The second input port is electrically connected to the output port of the register U162. The adder circuitry U164 may perform addition of a first electronic logic signal applied to the first input port and a second electronic logic signal applied to the second input port to output the electronic logic signal E1 representing the sum of the first electronic logic signal and the second electronic logic signal to the output port.

The LZA circuitry U165 may have a first input port, a second input port, and an output port. The electronic logic signal P6 is applied to the first input port of the LZA circuitry U165. The electronic logic signal ADD4 is applied to the second input port of the LZA circuitry U165. The electronic logic signal NZ1 is output to the output port of the LZA circuitry U165. The first input port is electrically connected to the output port of the register U161. The second input port is electrically connected to the output port of the register U162. The LZA circuitry U165 may anticipate and output the number of leading zero of the sum of a first electronic logic signal applied to the first input port and a second electronic logic signal applied to the second input port.

The register U170 may store the electronic logic signal MD1, the electronic logic signal NZ1, and the electronic logic signal E3. In some embodiments, the register U170 may comprise a plurality of one-bit registers for storing the electronic logic signal MD1, the electronic logic signal NZ1, and the electronic logic signal E3. In some embodiments, for convenience, the plurality of one-bit registers may be grouped into a register U171 storing the electronic logic signal MD1, a register U172 storing the electronic logic signal NZ1, and a register U173 storing the electronic logic signal E3.

The register U171 may have an input port and an output port. The electronic logic signal MD1 is applied to the input port. The electronic logic signal MD2 is output to the output port. The input port is electrically connected to the output port of the adder circuit U164. The register U171 may store an electronic logic signal applied to the input port and output a stored electronic logic signal to the output port at each clock.

The register U172 may have an input port and an output port. The electronic logic signal NZ1 is applied to the input port. The electronic logic signal NZ2 is output to the output port. The input port is electrically connected to the output port of the LZA circuit U165. The register U172 may store an electronic logic signal applied to the input port and output a stored electronic logic signal to the output port at each clock.

The register U173 may have an input port and an output port. The electronic logic signal E3 is applied to the input port. The electronic logic signal E4 is output to the output port. The input port is electrically connected to the output port of the register U163. The register U173 may store an electronic logic signal applied to the input port and output a stored electronic logic signal to the output port at each clock.

The normalizer circuit U174 may have a first input port, a second input port, and an output port. The electronic logic signal MD2 is applied to the first input port of the normalizer circuit U174. The electronic logic signal NZ2 is applied to the second input port of the normalizer circuit U174. The electronic logic signal MD3 representing a mantissa of a sum of a product of the electronic logic signals A and B and the electronic logic signal C (i.e., a mantissa of A×B+C) is output to the output port of the normalizer circuit U174. The first input port of the normalizer circuit U174 is electrically connected to the output port of the register U171. The second input port of the normalizer circuit U174 is electrically connected to the output port of the register U172. The normalizer circuit U174 may normalize a first electronic logic signal applied to the first input port based on the second electronic logic signal applied to the second input port and output an electronic logic signal representing a normalized first electronic logic signal to the output port. In some embodiments, the normalizer circuit U174 may a coarse position of a foremost most significant non-zero bit in the electronic logic signal MD2 based on the second electronic logic signal applied to the second input port, find an exact position of the foremost most significant non-zero bit in the electronic logic signal MD2 based on the coarse position, and output $N_M$ most significant bits from a bit located in the next position of the exact position in in the electronic logic signal MD2. In some embodiments, the normalizer circuit U174 may output the electronic logic signal MD3[$N_M$−1:0] set equal to MD2[$P_A$−1:$P_A$−$N_M$], where $P_A$ is the position of a foremost most significant non-zero bit in the electronic logic signal MD2. For example, if $N_M$ is equal to 9 and the electronic logic signal MD2[32:0] is [0 0 0 0 0 0 0 0 0 1 0 1 1 0 1 0 1 1 1 0 1 0 1 0 0 1 1 0 1 0], the PA is equal to 22 and MD3[8:0] is equal to [0 1 1 0 1 0 1 1 1].

The exponent calculator circuit U175 may have a first input port, a second input port, a third input port, and an output port. The electronic logic signal MD2 is applied to the first input port of the exponent calculator circuit U175. The electronic logic signal NZ2 is applied to the second input port of the exponent calculator circuit U175. The electronic logic signal E4 is applied to the third input port of the exponent calculator circuit U175. The electronic logic signal E5 representing a final exponent of a sum of a product of the electronic logic signals A and B and the electronic logic signal C (i.e., an exponent of A×B+C) is output to the output port of the exponent calculator circuit U175. The first input port of the exponent calculator circuit U175 is electrically connected to the output port of the register U171. The second input port of the exponent calculator circuit U175 is electrically connected to the output port of the register U172. The third input port of the exponent calculator circuit U175 is electrically connected to the output port of the register U173. The exponent calculator circuit U175 may calculate a final exponent based on a first electronic logic signal applied to the first input port, a second electronic logic signal applied to the second input port, and a third electronic logic signal applied to the third input port to output an electronic logic signal representing the final exponent to the output port. In some embodiments, the exponent calculator circuit U175 may perform subtraction of the electronic logic signal NZ2 from the electronic logic signal E4 to generate and output the electronic logic signal E5 representing the final exponent. In some embodiments, the exponent calculator circuit U175 may further consider a difference between the coarse position and the exact position of the foremost most significant non-zero bit in the electronic logic signal MD2 to generate and output the electronic logic signal E5. In some embodiments, the exponent calculator circuit U175 may further add the fixed bias to a subtraction result of the electronic logic signal NZ2 from the electronic logic signal E4 to generate and output the electronic logic signal E5.

The output circuitry U180 may store the electronic logic signal MD3 and the electronic logic signal E5. In some embodiments, the output circuitry U180 may comprise a plurality of one-bit registers for storing the electronic logic signal MD3 and the electronic logic signal E5. In some embodiments, for convenience, the plurality of one-bit registers may be grouped into a register U181 storing the electronic logic signal MD3 and a register U182 storing the electronic logic signal E5.

The register U181 may have an input port and an output port. The electronic logic signal MD3 is applied to the input port. The electronic logic signal MD4 is output to the output port. The input port is electrically connected to the output port of the normalizer circuit U175. The register U181 may store an electronic logic signal applied to the input port and output a stored electronic logic signal to the output port at each clock.

The register U182 may have an input port and an output port. The electronic logic signal E5 is applied to the input port. The electronic logic signal ED4 is output to the output port. The input port is electrically connected to the output port of the exponent calculator U174. The register U182 may store an electronic logic signal applied to the input port and output a stored electronic logic signal to the output port at each clock.

Figure 16:
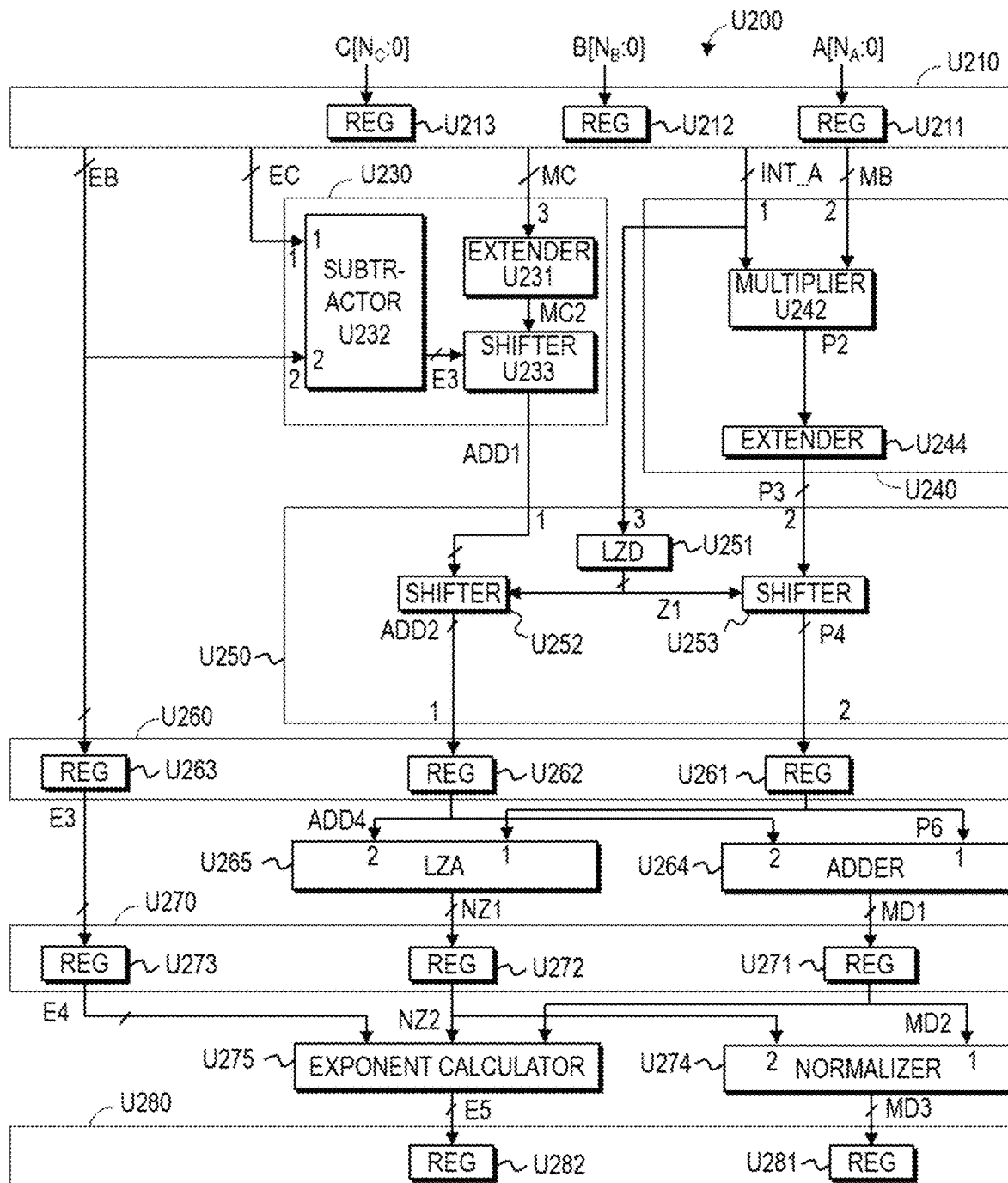
FIG. 16 shows a circuit diagram of a processor in accordance with an embodiment.

FIG. 16 shows a circuit diagram of a processor in accordance with an embodiment.

In particular, FIG. 16 shows a circuit diagram of a processor dedicated to calculating a product of an integer represented by an electronic logic signal A and a floating-point number represented by an electronic logic signal B and calculating a sum of the product and an addend represented by an electronic logic signal C with dynamic aligner circuitry to reduce or remove truncated bits and improve accuracy of calculations and without converting a format of an electronic logic signal A from an integer format to a floating-point number format to reduce hardware resources or components required for calculations.

As shown in FIG. 16, a processor U200 comprises input circuitry U210, aligner circuitry U230, multiplier circuitry U240, dynamic aligner circuitry U250, a register U261, a register U262, a register U263, adder circuitry U264, LZA circuitry U265, a register U271, a register U272, a register U273, a normalizer circuit U274, an exponent calculator circuit U275, and output circuitry U280.

The input circuitry U210 may comprise a plurality of one-bit registers for storing the electronic logic signal A[$N_A$−1:0], the electronic logic signal B[$N_B$−1:0], and the electronic logic signal C[$N_C$−1:0]. In some embodiments, for convenience, as shown in FIG. 16, the plurality of one-bit registers may be grouped into a register U211 storing the electronic logic signal A[$N_A$−1:0], a register U212 storing the electronic logic signal B[$N_B$−1:0], and a register U213 storing the electronic logic signal C[$N_C$−1:0].

The aligner circuitry U230 may comprise a bit extender circuit U231, a subtractor circuit U232, and a shifter circuit U233.

The multiplier circuitry U240 may comprise a multiplier circuit U242 and a bit extender circuit U244.

Since the operations and connections of the input circuitry U210, the register U211, the register U212, the register U213, the aligner circuitry U230, the bit extender circuit U231, the subtractor circuit U232, the shifter circuit U233, the multiplier circuit U242, and the bit extender circuit U244 are the same as or similar to those of the input circuitry U110, the register U111, the register U112, the register U113, the aligner circuitry U130, the bit extender circuit U131, the subtractor circuit U132, the shifter circuit U133, the multiplier circuit U142, and the bit extender circuit U144 shown in FIG. 13, their descriptions will be omitted.

The dynamic aligner circuitry U250 may have a first input port, a second input port, a third input port, a first output port, and a second output port. The electronic logic signal ADD1 is applied to the first input port of the dynamic aligner circuitry U250. The electronic logic signal P3 is applied to the second input port of the dynamic aligner circuitry U250. The electronic logic signal INT_A is applied to the third input port of the dynamic aligner circuitry U250. The electronic logic signal ADD2 is output to the first output port of the dynamic aligner circuitry U250. The electronic logic signal P4 is output to the second output port of the dynamic aligner circuitry U250. The first input port of the dynamic aligner circuitry U250 is electrically connected to the output port of the aligner circuitry U230. The second input port of the dynamic aligner circuitry U250 is electrically connected to the output port of the multiplier circuitry U240. The dynamic aligner circuitry U250 may shift bits of electronic logic signals applied to the first input port and the second input port based on the number of leading zero bits in an electronic logic signal applied to the third input port to output shifted electronic logic signals to the first output port and the second output port, respectively.

In some embodiments, as shown in FIG. 16, the dynamic aligner circuitry U250 may comprise a leading zero detector circuit U251, a shifter circuit U252, and a shifter circuit U253.

The leading zero detector circuit U251 may have an input port and an output port. The electronic logic signal INT_A is applied to the input port. The electronic logic signal Z1 representing the number of leading zeros in the electronic logic signal INT_A is output to the output port. The leading zero detector circuit U251 may detect and output the number of leading zeros in the electronic logic signal applied to the input port. In some embodiments, the leading zero detector circuit U251 may output the electronic logic signal Z1 set equal to ($N_Z$−1), where $N_Z$ is the number of leading zeros in ($N_{INT}$−1) most significant bits of the electronic logic signal INT_A, as shown in Table 1.

TABLE 1

| INT_A | Z1 |
|---|---|
| 0 1 * * * * * * | 0 |
| 0 0 1 * * * * * | 1 |
| 0 0 0 1 * * * * | 2 |
| 0 0 0 0 1 * * * | 3 |
| 0 0 0 0 0 1 * * | 4 |
| 0 0 0 0 0 0 1 * | 5 |
| 0 0 0 0 0 0 0 * | 6 |

The shifter circuit U252 may have a first input port, a second input port, and an output port. The electronic logic signal ADD1 is applied to the first input port of the shifter circuit U252. The electronic logic signal Z1 is applied to the second input port of the shifter circuit U252. The electronic logic signal ADD2 representing a dynamically shifted signal of the electronic logic signal ADD1 is output to the output port of the shifter circuit U252. The first input port of the shifter circuit U252 may be electronically connected to the first input port of the dynamic aligner circuitry U250. The second input port of the shifter circuit U252 may be electronically connected to the output port of the LZD U251. The shifter circuit U252 may shift bits of an electronic logic signal applied to the first input port as determined by an electronic logic signal applied to the second input port to output a shifted electronic logic signal to the output port. In some embodiments, the shifter circuit U252 may be implemented by a Barrel shifter.

The shifter circuit U253 may have a first input port, a second input port, and an output port. The electronic logic signal P3 is applied to the first input port. The electronic logic signal Z1 is applied to the second input port. The electronic logic signal P4 representing a dynamically shifted signal of the electronic logic signal P3 is output to the output port. The first input port of the shifter circuit U253 may be electronically connected to the second input port of the dynamic aligner circuitry U250. The second input port of the shifter circuit U253 may be electronically connected to the output port of the LZD U251. The shifter circuit U253 may shift bits of an electronic logic signal applied to the first input port as determined by an electronic logic signal applied to the second input port to output a shifted electronic logic signal to the output port. In some embodiments, the shifter circuit U253 may be implemented by a Barrel shifter.

The register U260 may receive and store the electronic logic signal P4, the electronic logic signal ADD2, and the electronic logic signal EB. In some embodiments, the register U260 may comprise a plurality of one-bit registers for storing the electronic logic signal P4, the electronic logic signal ADD2, and the electronic logic signal EB. In some embodiments, for convenience, the plurality of one-bit registers may be grouped into a register U261 storing the electronic logic signal P4, a register U262 storing the electronic logic signal ADD2, and a register U263 storing the electronic logic signal EB.

The register U261 may have an input port and an output port. The electronic logic signal P4 is applied to the input port. The electronic logic signal P6 is output to the output port. The input port is electrically connected to the output port of the shifter circuit U253. The register U261 may store an electronic logic signal applied to the input port and output a stored electronic logic signal to the output port at each clock.

The register U262 may have an input port and an output port. The electronic logic signal ADD2 is applied to the input port. The electronic logic signal ADD4 representing a final addend is output to the output port. The input port is electrically connected to the output port of the shifter circuit U252. The register U262 may store an electronic logic signal applied to the input port and output a stored electronic logic signal to the output port at each clock.

The register U263 may have an input port and an output port. The electronic logic signal EB is applied to the input port. The electronic logic signal E3 is output to the output port. The input port is electrically connected to the output port of the multiplexer circuit U222. The register U263 may store an electronic logic signal applied to the input port and output a stored electronic logic signal to the output port at each clock.

Because operations and connections of the adder circuitry U264, the LZA circuitry U265, the register U270, the register U271, the register U272, the register U273, the normalizer circuit U274, the exponent calculator circuit U275, the output circuitry U280, the register U281, and the register U282 are the same as or similar to those of the adder circuitry U164, the LZA circuitry U165, the register U170, the register U171, the register U172, the register U173, the normalizer circuit U174, the exponent calculator circuit U175, the output circuitry U180, the register U181, and the register U182 shown in FIG. 13, their descriptions will be omitted.

Figure 17:
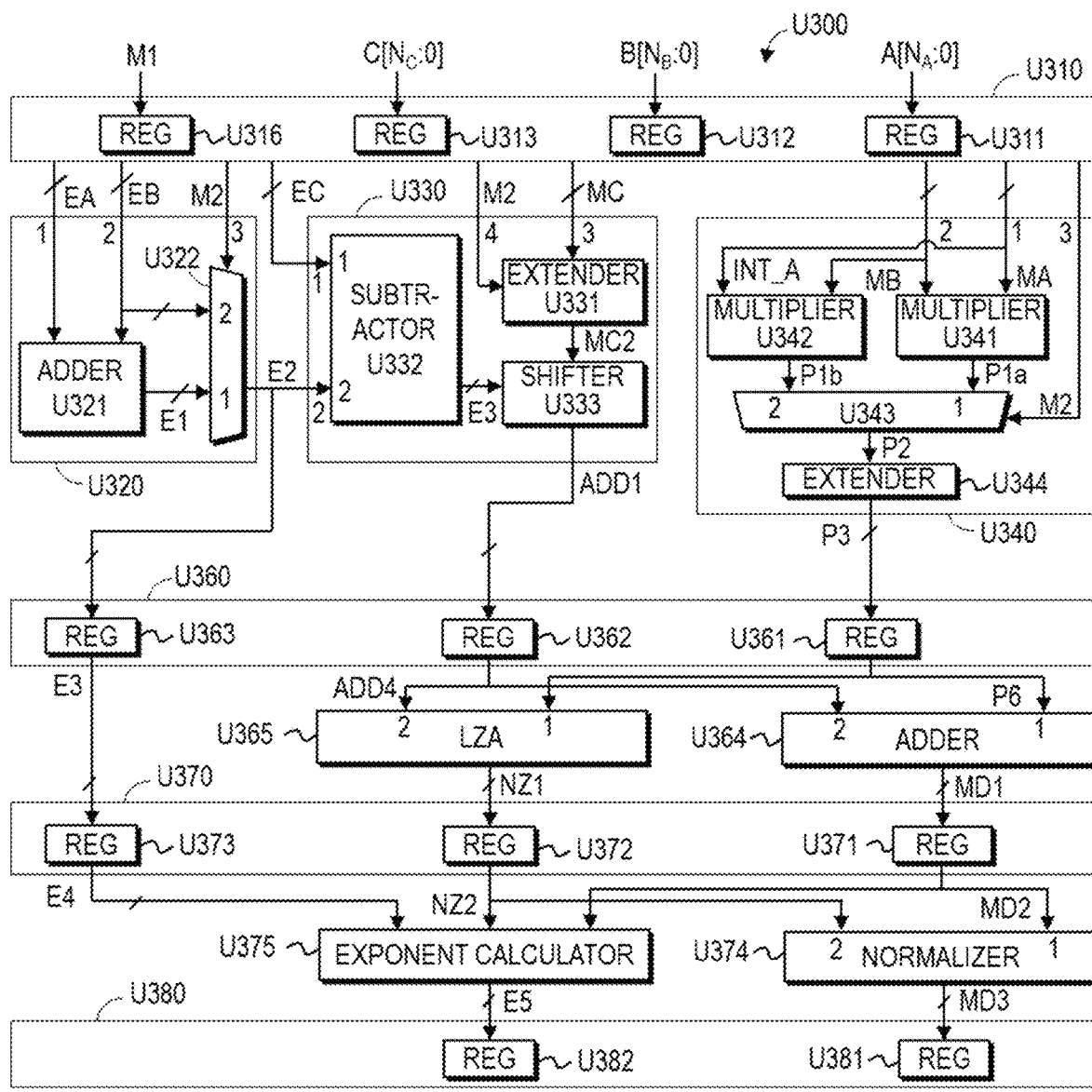
FIG. 17 shows a circuit diagram of a processor in accordance with an embodiment.

FIG. 17 shows a circuit diagram of a processor in accordance with an embodiment.

In particular, FIG. 17 shows a circuit diagram of a processor capable of calculating a product of a number represented by an electronic logic signal A and a floating-point number represented by an electronic logic signal B and calculating a sum of the product and an addend represented by an electronic logic signal C when the electronic logic signal A represents one between an integer and a floating-point number according to a mode signal, without converting a format of an electronic logic signal A from an integer format to a floating-point number format to reduce hardware resources or components required for calculations.

As shown in FIG. 17, a processor U300 comprises input circuitry U310, exponent calculator circuitry U320, aligner circuitry U330, multiplier circuitry U340, a register U361, a register U362, a register U363, adder circuitry U364, LZA circuitry U365, a register U371, a register U372, a register U373, a normalizer circuit U374, an exponent calculator circuit U375, and output circuitry U380.

The input circuitry U310 may receive and store an electronic logic signal $A[N_A-1:0]$, an electronic logic signal $B[N_B-1:0]$, and an electronic logic signal $C[N_C-1:0]$, where NA represents the number of bits in the electronic logic signal $A[N_A-1:0]$, $N_B$ represents the number of bits in the electronic logic signal $A[N_B-1:0]$, and $N_C$ represents the number of bits in the electronic logic signal $A[N_C-1:0]$. In some embodiments, $N_A=N_B=N_C$. For example, $N_A=N_B=N_C=16$. In some embodiments, $N_B=N_C$ and $N_A\neq N_B$. For example, $N_B=N_C=16$ and $N_A=N_B/2=8$.

The input circuitry U310 may receive a mode signal M1 indicating formats of the electronic logic signal $A[N_A-1:0]$, the electronic logic signal $B[N_B-1:0]$, and the electronic logic signal $C[N_C-1:0]$.

The input circuitry U310 may comprise a plurality of one-bit registers for storing the electronic logic signal $A[N_A-1:0]$, the electronic logic signal $B[N_B-1:0]$, the electronic logic signal $C[N_C-1:0]$, and the mode signal M1. In some embodiments, for convenience, as shown in FIG. 17, the plurality of one-bit registers may be grouped into a register U311 storing the electronic logic signal $A[N_A-1:0]$, a register U312 storing the electronic logic signal $B[N_B-1:0]$, a register U313 storing the electronic logic signal $C[N_C-1:0]$, and a register U316 storing the mode signal M1. Each of the plurality of one-bit registers has an input port and an output port. Each of the plurality of one-bit registers may store a one-bit electronic logic signal applied to the input port and output a stored one-bit electronic logic signal to the output port at each clock.

In some embodiments, the mode signal M1 may indicate a current mode between a plurality of modes, for example, including a first mode and a second mode. In some embodiments, in the first mode, the electronic logic signal $A[N_A-1:0]$, the electronic logic signal $B[N_B-1:0]$, and the electronic logic signal $C[N_C-1:0]$ may represent floating-point numbers. In some embodiments, in the second mode, the electronic logic signal $A[N_A-1:0]$ may represent an integer and the electronic logic signal $B[N_B-1:0]$ and the electronic logic signal $C[N_C-1:0]$ may represent floating-point numbers.

When the electronic logic signal $A[N_A-1:0]$ represents a floating-point number, the register U311 may output an electronic logic signal MA representing a mantissa of the electronic logic signal A, an electronic logic signal EA representing an exponent of the electronic logic signal A, and an electronic logic signal SA representing a sign of the electronic logic signal A. In some embodiments, $EA=A[N_E+N_M-1, N_M]$, $MA=\{1, A[N_M-1:0]\}$, and $SA=A[N_E+N_M]$, where $N_E$ is the number of bits representing an exponent of a floating-point number and $N_M$ is the number of bits representing a mantissa of a floating-point number. In some embodiments, when the electronic logic signal $A[N_A-1:0]$ represents a floating-point number of the DLFloat format, NE may be equal to 6 and Nu may be equal to 9.

When the electronic logic signal $A[N_A-1:0]$ represents an integer, the register U311 may output an electronic logic signal INT_A representing an integer value of the electronic logic signal A. In some embodiments, $INT\_A=A[N_{INT}-1:0]$, where NINT is the number of bits representing an integer value. In some embodiments, when the electronic logic signal $A[N_A-1:0]$ represents an integer of the INT8 format, $N_{INT}$ may be equal to 8.

When the electronic logic signal $B[N_B-1:0]$ represents a floating-point number, the register U312 may output an electronic logic signal MB representing a mantissa of the electronic logic signal B, an electronic logic signal EB representing an exponent of the electronic logic signal B, and an electronic logic signal SB representing a sign of the electronic logic signal B. In some embodiments, $EB=B[N_E+N_M-1, N_M]$, $MB=\{1, B[N_M-1:0]\}$, and $SB=B[N_E+N_M]$.

When the electronic logic signal $C[N_C-1:0]$ represents a floating-point number, the register U313 may output an electronic logic signal MC representing a mantissa of the electronic logic signal C, an electronic logic signal EC representing an exponent of the electronic logic signal C, and an electronic logic signal SC representing a sign of the electronic logic signal C. In some embodiments, $EC=C[N_E+N_M-1, N_M]$, $MC=\{1, C[N_M-1:0]\}$, and $SC=C[N_E+N_M]$.

The register U316 may output the mode signal M2.

The exponent calculator circuitry U320 may have a first input port and a second input port, a third input port, and an output port. The electronic logic signal EA is applied to the first input port. The electronic logic signal EB is applied to the second input port. The electronic logic signal M2 is applied to the third input port. The electronic logic signal E2 is output to the output port.

The exponent calculator circuitry U320 may perform addition of a first electronic logic signal applied to the first input port and a second electronic logic signal applied to the second input port to generate an electronic logic signal E1 representing a sum of the first electronic logic signal and the second electronic logic signal. The exponent calculator circuitry U320 may select one of the electronic logic signal E1 and the electronic logic signal EB based on the mode signal M2 to output a selected electronic logic signal as the electronic logic signal E2 to the output port of the exponent calculator circuitry U320. In some embodiments, if the mode signal M2 indicates the first mode, the exponent calculator circuitry U320 may select and output the electronic logic signal E1 as the electronic logic signal E2. If the mode signal M2 indicates the second mode, the exponent calculator circuitry U320 may select and output the electronic logic signal EB as the electronic logic signal E2.

In some embodiments, as shown in FIG. 17, the exponent calculator circuitry U320 may comprise an adder circuit U321 and a multiplexer circuit U322.

The adder circuit U321 may have a first input port, a second input port, and an output port. The electronic logic signal EA is applied to the first input port. The electronic logic signal EB is applied to the second input port. The adder circuit U321 may perform addition of a first electronic logic signal applied to the first input port and a second electronic logic signal applied to the second input port to output an electronic logic signal representing a sum of the first electronic logic signal and the second electronic logic signal to the output port of the adder circuit U321. In some embodiments, the electronic logic signals EA, EB, and EC may represent values having a fixed bias added to the actual exponents. For example, the fixed bias is equal to $2^{N_E}-1$. In some embodiments, the adder circuit U321 may perform addition of the electronic logic signal EA, the electronic logic signal EB, and a minus value of the fixed bias.

In some embodiments, the adder circuit U321 may be enabled when the mode signal M2 indicates that the current mode is the first mode and disabled when the mode signal M2 indicates that the current mode is the second mode to save powers.

The multiplexer circuit U322 may have a first input port, a second input port, a select input port, and an output port. An electronic logic signal E1 is applied to the first input port of the multiplexer circuit U322. An electronic logic signal EB is applied to the second input port of the multiplexer circuit U322. An electronic logic signal M2 is applied to the select input port of the multiplexer circuit U322. An electronic logic signal E2 is output to the output port of the multiplexer circuit U322. The first input port of the multiplexer circuit U322 is electrically connected to the output port of the adder circuit U321. The second input port of the multiplexer circuit U322 is electrically connected to the second input port of the exponent calculator circuitry U320. The select input port of the multiplexer circuit U322 is electrically connected to the third input port of the exponent calculator circuitry U320. The output port of the multiplexer circuit U322 is electrically connected to the output port of the exponent calculator circuitry U320.

The multiplexer circuit U322 may select one of a first electronic logic signal applied to the first input port and a second electronic logic signal applied to the second input port based on an electronic logic signal applied to the select input port to output a selected electronic logic signal to the output port.

The aligner circuitry U330 may have a first input port, a second input port, a third input port, a fourth input port, and an output port. The electronic logic signal EC is applied to the first input port of the aligner circuitry U330. The electronic logic signal E2 is applied to the second input port of the aligner circuitry U330. The electronic logic signal MC is applied to the third input port of the aligner circuitry U330. The electronic logic signal M2 is applied to the fourth input port of the aligner circuitry U330. The electronic logic signal ADD1 representing an addend is output to the output port of the aligner circuitry U330. The second input port of the aligner circuitry U330 is electrically connected to the output port of the exponent calculator circuitry U320. The aligner circuitry U330 may align the electronic logic signal MC based on the electronic logic signal EC, the electronic logic signal E2, and the electronic logic signal M2 to output an aligned electronic logic signal of the electronic logic signal MC.

In some embodiments, as shown in FIG. 17, the aligner circuitry U330 may comprise a bit extender circuit U331, a subtractor circuit U332, and a shifter circuit U333.

The bit extender circuit U331 may have a first input port, a second input port, and an output port. The electronic logic signal MC is applied to the first input port of the bit extender circuit U331. The electronic logic signal M2 is applied to the second input port of the bit extender circuit U331. In some embodiments, the bit extender circuit U331 may transform the electronic logic signal MC into an extended electronic logic signal MC2 and output the extended electronic logic signal MC2 to the output port. The number of bits in the extended electronic logic signal MC2 is greater than the number of bits in the electronic logic signal MC.

In some embodiments, the bit extender circuit U331 may generate and output the extended electronic logic signal MC2 based on the mode signal M2. For example, if the mode signal M2 indicates that the electronic logic signal A[NA−1:0] represents an integer, the bit extender circuit U331 may output the extended electronic logic signal MC2 as shown in FIG. 14. If the mode signal M2 indicates that the electronic logic signal A[NA−1:0] represents a floating-point number, the bit extender circuit U331 may output the extended electronic logic signal MC2 as shown in FIG. 18.

Figure 18:
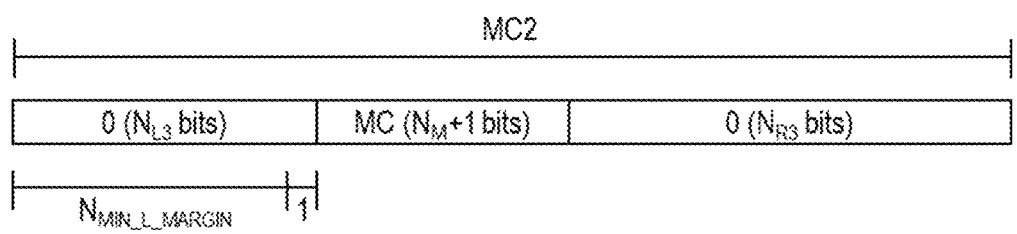
FIG. 18 shows an extended electronic logic signal representing a mantissa in accordance with an embodiment.

FIG. 18 shows an extended electronic logic signal representing a mantissa in accordance with an embodiment.

As shown in FIG. 18, $N_{L3}$ zero-value bits may be appended to the left of the electronic logic signal MC and $N_{R3}$ zero-value bits may be appended to the left of the electronic logic signal MC to output the extended electronic logic signal MC2 representing $N_T$ bits, where $N_{L3}(>0)$ represents the number of zero-value bits appended to the left of the electronic logic signal MC, $N_{R3}(>0)$ represents the number of zero-value bits appended to the right of the electronic logic signal MC, and $N_T(=N_{L3}+N_M+1+N_{R3})$ represents the number of bits in the extended electronic logic signal. In some embodiments, $N_{L3}$ may be equal to $N_{MIN\_L\_MARGIN}+1$, where $N_{MIN\_L\_MARGIN}$ represents the minimum number of zero-value bits appended to the left of the electronic logic signal MC required for avoiding truncation of data. In some embodiments, zero-value bits may additionally be appended to the left of the electronic logic signal MC to align the electronic logic signal MC with a product of a mantissa of the electronic logic signal A and a mantissa of the electronic logic signal B. In this scenario, as shown in FIG. 18, one zero-value bit may additionally be appended to the left of the electronic logic signal MC.

Referring to FIG. 17 again, the subtractor circuit U332 may have a first input port, a second input port, and an output port. The electronic logic signal EC is applied to the first input port of the subtractor circuit U332 as a minuend. The electronic logic signal E2 is applied to the second input port of the subtractor circuit U332 as a subtrahend. The electronic logic signal E3 is output to the output port of the subtractor circuit U332 as a difference between the minuend and the subtrahend. The first input port of the subtractor circuit U332 is electrically connected to the first input port of the aligner circuitry U330. The second input port of the subtractor circuit U332 is electrically connected to the second input port of the aligner circuitry U330. The subtractor circuit U332 may perform subtraction of a second electronic logic signal applied to the second input port from a first electronic logic signal applied to the first input port to output an electronic logic signal representing a difference between the first electronic logic signal and the second electronic logic signal. In some embodiments, the electronic logic signal E3 may represent a difference between an exponent of a product of the electronic logic signal A and the electronic logic signal B and an exponent of the electronic logic signal B.

The shifter circuit U333 may have a first input port, a second input port, and an output port. The electronic logic signal MC2 is applied to the first input port of the shifter circuit U333. The electronic logic signal E3 is applied to the second input port of the shifter circuit U333. An electronic logic signal ADD1 is output to the output port of the shifter circuit U333. The first input port of the shifter circuit U333 is electrically connected to the output port of the bit extender circuit U331. The second input port of the shifter circuit U333 is electrically connected to the output port of the subtractor circuit U332. The output port of the shifter circuit U333 is electrically connected to the output port of the aligner circuitry U330. The shifter circuit U333 may shift bits of an electronic logic signal applied to the first input port as determined by an electronic logic signal applied to the second input port to output a shifted electronic logic signal to the output port. In some embodiments, the shifter circuit U333 may be implemented by a Barrel shifter.

The multiplier circuitry U340 may have a first input port, a second input port, a third input port, and an output port. A part of bits in the electronic logic signal A covering the electronic logic signal MA and the electronic logic signal INT_A is applied to the first input port. In some embodiments, the electronic logic signal $A[N_{A2}:0]$ may be applied to the first input port, where NA2 is a maximum between $N_{INT}$ and $N_M$. The electronic logic signal MB is applied to the second input port. The electronic logic signal M2 is applied to the third input port. The electronic logic signal P2 is output to the output port. The multiplier circuitry U340 may perform multiplication of a first electronic logic signal applied to the first input port and a second electronic logic signal applied to the second input port to output an electronic logic signal representing a product of the first electronic logic signal and the second electronic logic signal to the output port.

In some embodiments, as shown in FIG. 17, the multiplier circuitry U340 may comprise a multiplier circuit U341, a multiplier circuit U342, a multiplexer circuit U343, and a bit extender circuit U344.

The multiplier circuit U341 may have a first input port, a second input port, and an output port. The electronic logic signal MA is applied to the first input port of the multiplier circuit U341. The electronic logic signal MB is applied to the second input port of the multiplier circuit U341. The electronic logic signal P1a representing a product of the electronic logic signal MA and the electronic logic signal MB is output to the output port of the multiplier circuit U341. The first input port of the multiplier circuit U341 is electrically connected to the first input port of the multiplier circuitry U340. The second input port of the multiplier circuit U341 is electrically connected to the second input port of the multiplier circuitry U340. The multiplier circuit U341 may perform multiplication of $(N_M+1)$ bits in a first electronic logic signal applied to the first input port and $(N_M+1)$ bits in a second electronic logic signal applied to the second input port to output an electronic logic signal including $2\times(N_M+1)$ bits representing a product of the first electronic logic signal and the second electronic logic signal to the output port.

The multiplier circuit U342 may have a first input port, a second input port, and an output port. The electronic logic signal INT_A is applied to the first input port of the multiplier circuit U342. The electronic logic signal MB is applied to the second input port of the multiplier circuit U342. The electronic logic signal P1b representing a product of the electronic logic signal INT_A and the electronic logic signal MB is output to the output port of the multiplier circuit U342. The first input port of the multiplier circuit U342 is electrically connected to the first input port of the multiplier circuitry U340. The second input port of the multiplier circuit U342 is electrically connected to the second input port of the multiplier circuitry U340. The multiplier circuit U342 may perform multiplication of $N_{INT}$ bits in a first electronic logic signal applied to the first input port and $(N_M+1)$ bits in a second electronic logic signal applied to the second input port to output an electronic logic signal including $(N_{INT}+N_M+1)$ bits representing a product of the first electronic logic signal and the second electronic logic signal to the output port.

In some embodiments, the multiplier circuit U341 and the multiplier circuit U342 may be implemented by a plurality of logic gates. In some embodiments, the multiplier circuit U341 and the multiplier circuit U342 may share common logic gates even though the multiplier circuit U341 and the multiplier circuit U342 are separately depicted in FIG. 17.

In some embodiments, the multiplier circuit U341 may be enabled when the mode signal M2 indicates that the current mode is the first mode and disabled when the mode signal M2 indicates that the current mode is the second mode to save powers. In some embodiments, the multiplier circuit U342 may be enabled when the mode signal M2 indicates that the current mode is the second mode and disabled when the mode signal M2 indicates that the current mode is the first mode to save powers.

The multiplexer circuit U343 may have a first input port, a second input port, a select input port, and an output port. The electronic logic signal P1a is applied to the first input port of the multiplexer circuit U343. An electronic logic signal P1b is applied to the second input port of the multiplexer circuit U343. In some embodiments, when the number of bits in the electronic logic signal P1b is less than the number of bits in the electronic logic signal P1a, one or more zero-value bits may be appended to the left of the electronic logic signal P1b so that the number of bits in the electronic logic signal P1b with one or more zero-value bits appended is equal to the number of bits in the electronic logic signal P1a, and then the electronic logic signal P1b with one or more zero-value bits appended may be applied to the first input port of the multiplexer circuit U343. In some embodiments, when the number of bits in the electronic logic signal P1a is less than the number of bits in the electronic logic signal P1b, one or more zero-value bits may be appended to the left of the electronic logic signal P1a so that the number of bits in the electronic logic signal P1a with one or more zero-value bits appended is equal to the number of bits in the electronic logic signal P1b, and then the electronic logic signal P1a with one or more zero-value bits appended may be applied to the first input port of the multiplexer circuit U343. For example, when $N_{INT}$ is equal to 8 and $N_M$ is equal to 9, the number of bits in the electronic logic signal P1a may be equal to 20 and the number of bits in the electronic logic signal P1b may be equal to 18. In this scenario, {P1b,0,0} may be applied to the first input port of the multiplexer circuit U343.

The electronic logic signal M2 is applied to the select input port of the multiplexer circuit U343. An electronic logic signal P2 is output to the output port of the multiplexer circuit U343. The first input port of the multiplexer circuit U343 is electrically connected to the output port of the multiplier circuit U341. The second input port of the multiplexer circuit U343 is electrically connected to the output port of the multiplier circuit U342. The multiplexer circuit U343 may select one of a first electronic logic signal applied to the first input port and a second electronic logic signal applied to the second input port based on an electronic logic signal applied to the select input port to output a selected electronic logic signal to the output port.

The bit extender circuit U344 may have an input port and an output port. The electronic logic signal P2 is applied to the input port of the bit extender circuit U344. The electronic logic signal P3 is output to the output port of the bit extender circuit U344. The input port of the bit extender circuit U344 is electrically connected to the output port of the multiplexer circuit U343. The output port of the bit extender circuit U344 is electrically connected to the output port of the multiplier circuitry U340. In some embodiments, the bit extender circuit U344 may transform the electronic logic signal P2 into an extended electronic logic signal P3 and output the extended electronic logic signal P3 to the output port. The number of bits in the extended electronic logic signal P3 is greater than the number of bits in the electronic logic signal P2. The bit extender circuit U344 may generate and output the extended electronic logic signal P3 as shown in FIG. 15.

Referring to FIG. 17 again, the register U360 may receive and store the electronic logic signal P3, the electronic logic signal ADD1, and the electronic logic signal E2. In some embodiments, the register U360 may comprise a plurality of one-bit registers for storing the electronic logic signal P3, the electronic logic signal ADD1, and the electronic logic signal E2. In some embodiments, for convenience, the plurality of one-bit registers may be grouped into a register U361 storing the electronic logic signal P3, a register U362 storing the electronic logic signal ADD1, and a register U363 storing the electronic logic signal E2.

The register U361 may have an input port and an output port. The electronic logic signal P3 is applied to the input port. The electronic logic signal P6 is output to the output port. The input port is electrically connected to the output port of the multiplexer circuit U355. The register U361 may store an electronic logic signal applied to the input port and output a stored electronic logic signal to the output port at each clock.

The register U362 may have an input port and an output port. The electronic logic signal ADD1 is applied to the input port. The electronic logic signal ADD4 representing a final addend is output to the output port. The input port is electrically connected to the output port of the multiplexer circuit U354. The register U362 may store an electronic logic signal applied to the input port and output a stored electronic logic signal to the output port at each clock.

The register U363 may have an input port and an output port. The electronic logic signal E2 is applied to the input port. The electronic logic signal E3 is output to the output port. The input port is electrically connected to the output port of the multiplexer circuit U322. The register U363 may store an electronic logic signal applied to the input port and output a stored electronic logic signal to the output port at each clock.

Because operations and connections of the adder circuitry U364, the LZA circuitry U365, the register U370, the register U371, the register U372, the register U373, the normalizer circuit U374, the exponent calculator circuit U375, the output circuitry U380, the register U381, and the register U382 are the same as or similar to those of the adder circuitry U164, the LZA circuitry U165, the register U170, the register U171, the register U172, the register U173, the normalizer circuit U174, the exponent calculator circuit U175, the output circuitry U180, the register U181, and the register U182 shown in FIG. 13, their descriptions will be omitted.

Figure 19:
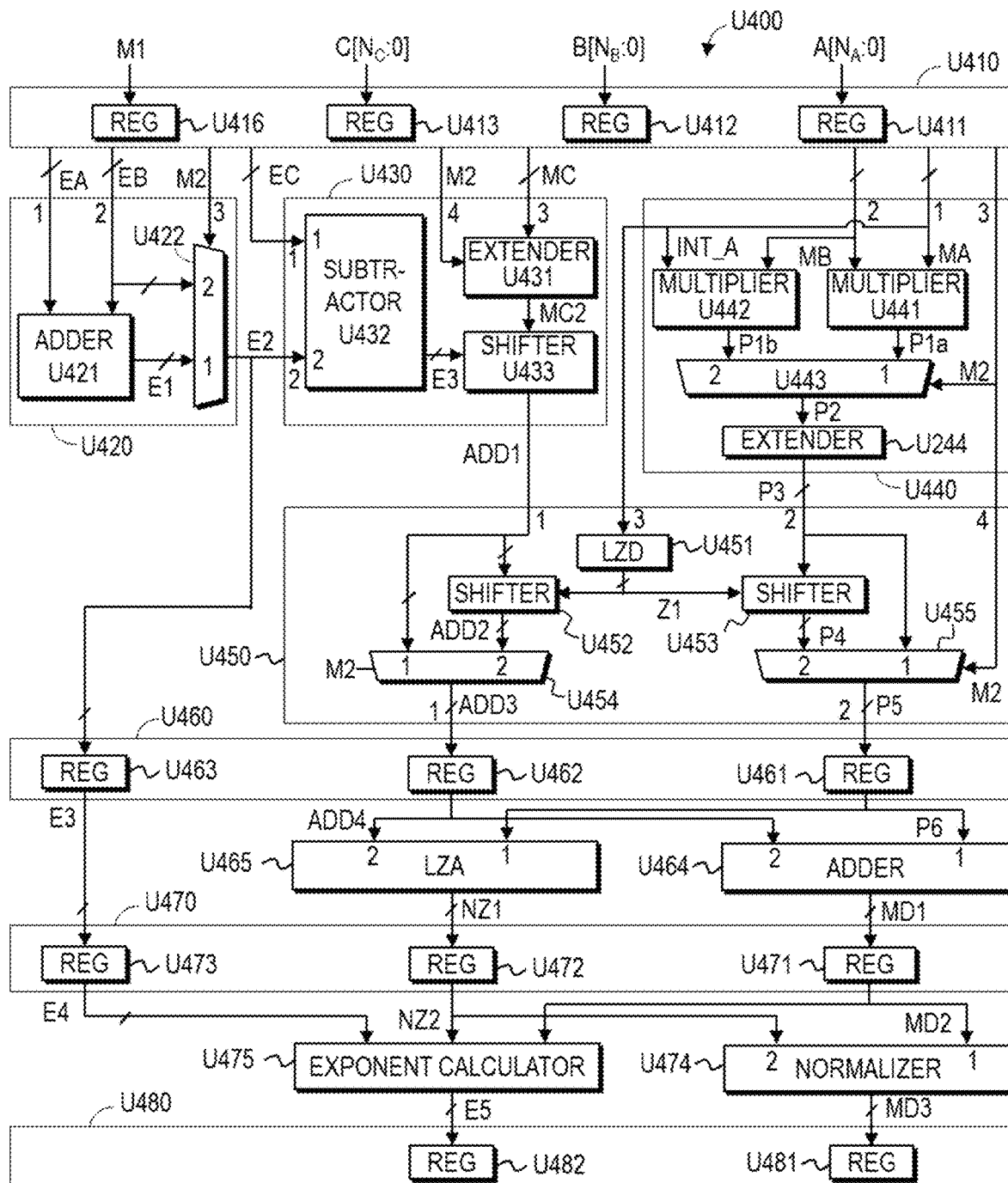
FIG. 19 shows a circuit diagram of a processor in accordance with an embodiment.

FIG. 19 shows a circuit diagram of a processor in accordance with an embodiment.

In particular, FIG. 19 shows a circuit diagram of a processor capable of calculating a product of a number represented by an electronic logic signal A and a floating-point number represented by an electronic logic signal B and calculating a sum of the product and an addend represented by an electronic logic signal C when the electronic logic signal A represents one between an integer and a floating-point number according to a mode signal, with dynamic aligner circuitry to reduce or remove truncated bits and improve accuracy of calculations and without converting a format of an electronic logic signal A from an integer format to a floating-point number format to reduce hardware resources or components required for calculations.

As shown in FIG. 19, a processor U400 comprises input circuitry U410, exponent calculator circuitry U420, aligner circuitry U430, multiplier circuitry U440, dynamic aligner circuitry U450, a register U461, a register U462, a register U463, adder circuitry U464, LZA circuitry U465, a register U471, a register U472, a register U473, a normalizer circuit U474, an exponent calculator circuit U475, and output circuitry U480.

The input circuitry U410 may comprise a plurality of one-bit registers for storing the electronic logic signal $A[N_A-1:0]$, the electronic logic signal $B[N_B-1:0]$, the electronic logic signal $C[N_C-1:0]$, and the mode signal M1. In some embodiments, for convenience, as shown in FIG. 19, the plurality of one-bit registers may be grouped into a register U411 storing the electronic logic signal $A[N_A-1:0]$, a register U412 storing the electronic logic signal $B[N_B-1:0]$, a register U413 storing the electronic logic signal $C[N_C-1:0]$, and a register U416 storing the mode signal M1.

The exponent calculator circuitry U420 may comprise an adder circuit U421 and a multiplexer circuit U422.

The aligner circuitry U130 may comprise a bit extender circuit U131, a subtractor circuit U132, and a shifter circuit U133.

The multiplier circuitry U140 may comprise a multiplier circuit U141, a multiplier circuit U142, a multiplexer circuit U143, and a bit extender circuit U144.

Since the operations and connections of the input circuitry U410, the register U411, a register U412, the register U413, the register U416, the exponent calculator circuitry U420, the adder circuit U421, the multiplexer circuit U422, the aligner circuitry U430, the bit extender circuit U431, the subtractor circuit U432, the shifter circuit U433, the multiplier circuitry U440 the multiplier circuit U441, the multiplier circuit U442, the multiplexer circuit U443, and the bit extender circuit U444 are the same as or similar to those of the input circuitry U310, the register U311, a register U312, the register U313, the register U316, the exponent calculator circuitry U320, the adder circuit U321, the multiplexer circuit U322, the aligner circuitry U330, the bit extender circuit U331, the subtractor circuit U332, the shifter circuit U333, the multiplier circuitry U340 the multiplier circuit U341, the multiplier circuit U342, the multiplexer circuit U343, and the bit extender circuit U344 shown in FIG. 17, their descriptions will be omitted.

The dynamic aligner circuitry U150 may have a first input port, a second input port, a third input port, a fourth input port, a first output port, and a second output port. The electronic logic signal ADD1 is applied to the first input port of the dynamic aligner circuitry U150. The electronic logic signal P3 is applied to the second input port of the dynamic aligner circuitry U150. The electronic logic signal INT_A is applied to the third input port of the dynamic aligner circuitry U150. The electronic logic signal M2 is applied to the fourth input port of the dynamic aligner circuitry U150. The electronic logic signal ADD3 is output to the first output port of the dynamic aligner circuitry U150. The electronic logic signal P5 is output to the second output port of the dynamic aligner circuitry U150. The first input port of the dynamic aligner circuitry U150 is electrically connected to the output port of the aligner circuitry U130. The second input port of the dynamic aligner circuitry U150 is electrically connected to the output port of the multiplier circuitry U140. The dynamic aligner circuitry U150 may shift bits of electronic logic signals applied to the first input port and the second input port based on the number of leading zero bits in an electronic logic signal applied to the third input port to output shifted electronic logic signals to the first output port and the second output port, respectively.

In some embodiments, as shown in FIG. 19, the dynamic aligner circuitry U150 may comprise a leading zero detector circuit U151, a shifter circuit U152, a shifter circuit U153, a multiplexer circuit U154, and a multiplexer circuit U155.

The leading zero detector circuit U151 may have an input port and an output port. The electronic logic signal INT_A is applied to the input port. The electronic logic signal Z1 representing the number of leading zeros in the electronic logic signal INT_A is output to the output port. The leading zero detector circuit U151 may detect and output the number of leading zeros in the electronic logic signal applied to the input port. In some embodiments, the leading zero detector circuit U151 may output the electronic logic signal Z1 set equal to ($N_Z$–1), where $N_Z$ is the number of leading zeros in ($N_{INT}$–1) most significant bits of the electronic logic signal INT_A, as shown in Table 1.

The shifter circuit U152 may have a first input port, a second input port, and an output port. The electronic logic signal ADD1 is applied to the first input port of the shifter circuit U152. The electronic logic signal Z1 is applied to the second input port of the shifter circuit U152. The electronic logic signal ADD2 representing a dynamically shifted signal of the electronic logic signal ADD1 is output to the output port of the shifter circuit U152. The first input port of the shifter circuit U152 may be electronically connected to the first input port of the dynamic aligner circuitry U150. The second input port of the shifter circuit U152 may be electronically connected to the output port of the LZD U151. The shifter circuit U152 may shift bits of an electronic logic signal applied to the first input port as determined by an electronic logic signal applied to the second input port to output a shifted electronic logic signal to the output port. In some embodiments, the shifter circuit U152 may be implemented by a Barrel shifter.

The shifter circuit U153 may have a first input port, a second input port, and an output port. The electronic logic signal P3 is applied to the first input port. The electronic logic signal Z1 is applied to the second input port. The electronic logic signal P4 representing a dynamically shifted signal of the electronic logic signal P3 is output to the output port. The first input port of the shifter circuit U153 may be electronically connected to the second input port of the dynamic aligner circuitry U150. The second input port of the shifter circuit U153 may be electronically connected to the output port of the LZD U151. The shifter circuit U153 may shift bits of an electronic logic signal applied to the first input port as determined by an electronic logic signal applied to the second input port to output a shifted electronic logic signal to the output port. In some embodiments, the shifter circuit U153 may be implemented by a Barrel shifter.

The multiplexer circuit U154 may have a first input port, a second input port, and an output port. The electronic logic signal ADD1 is applied to the first input port. The electronic logic signal ADD2 is applied to the second input port. The electronic logic signal ADD3 representing a final addend is output to the output port. The first input port of the multiplexer circuit U154 may be electronically connected to the first input port of the dynamic aligner circuitry U150. The second input port of the multiplexer circuit U154 may be electronically connected to the output port of the shifter U152. The output port of the multiplexer circuit U154 is electrically connected to the first output port of the dynamic aligner circuitry U150. The multiplexer circuit U154 may select one of a first electronic logic signal applied to the first input port and a second electronic logic signal applied to the second input port based on an electronic logic signal applied to the select input port to output a selected electronic logic signal to the output port.

The multiplexer circuit U155 may have a first input port, a second input port, and an output port. The electronic logic signal P3 is applied to the first input port of the multiplexer circuit U155. The electronic logic signal P4 is applied to the second input port of the multiplexer circuit U155. The electronic logic signal P5 is output to the output port of the multiplexer circuit U155. The first input port of the multiplexer circuit U155 may be electronically connected to the first input port of the dynamic aligner circuitry U150. The second input port of the multiplexer circuit U155 may be electronically connected to the output port of the shifter circuit U153. The output port of the multiplexer circuit U155 is electrically connected to the output port of the dynamic aligner circuitry U150. The multiplexer circuit U155 may select one of a first electronic logic signal applied to the first input port and a second electronic logic signal applied to the second input port based on an electronic logic signal applied to the select input port to output a selected electronic logic signal to the output port.

The register U160 may receive and store the electronic logic signal P5, the electronic logic signal ADD3, and the electronic logic signal E2. In some embodiments, the register U160 may comprise a plurality of one-bit registers for storing the electronic logic signal P5, the electronic logic signal ADD3, and the electronic logic signal E2. In some embodiments, for convenience, the plurality of one-bit registers may be grouped into a register U161 storing the electronic logic signal P5, a register U162 storing the electronic logic signal ADD3, and a register U163 storing the electronic logic signal E2.

The register U161 may have an input port and an output port. The electronic logic signal P5 is applied to the input port. The electronic logic signal P6 is output to the output port. The input port is electrically connected to the output port of the multiplexer circuit U155. The register U161 may store an electronic logic signal applied to the input port and output a stored electronic logic signal to the output port at each clock.

The register U162 may have an input port and an output port. The electronic logic signal ADD3 is applied to the input port. The electronic logic signal ADD4 representing a final addend is output to the output port. The input port is electrically connected to the output port of the multiplexer circuit U154. The register U162 may store an electronic logic signal applied to the input port and output a stored electronic logic signal to the output port at each clock.

The register U163 may have an input port and an output port. The electronic logic signal E2 is applied to the input port. The electronic logic signal E3 is output to the output port. The input port is electrically connected to the output port of the multiplexer circuit U122. The register U163 may store an electronic logic signal applied to the input port and output a stored electronic logic signal to the output port at each clock.

Because operations and connections of the adder circuitry U464, the LZA circuitry U465, the register U470, the register U471, the register U472, the register U473, the normalizer circuit U474, the exponent calculator circuit U475, the output circuitry U480, the register U481, and the register U482 are the same as or similar to those of the adder circuitry U164, the LZA circuitry U165, the register U170, the register U171, the register U172, the register U173, the normalizer circuit U174, the exponent calculator circuit U175, the output circuitry U180, the register U181, and the register U182 shown in FIG. 13, their descriptions will be omitted.

Two or more circuits described above may be grouped into a circuit. A group of circuits may be called, for example, but not limited to, an arithmetic logic circuit, a logic circuit, a grouped circuit, an operation circuit, a calculating circuit, and so on, and have one or more input ports and one or more output port. For example, the circuits U160, U164, U165, U170, U174, U175, and U180 may be grouped into a circuit and the group of the circuits may be called an arithmetic logic unit having a first input port configured to receive the electronic logic signal P3, a second input port configured to receive the electronic logic signal ADD1, a third input port configured to receive the electronic logic signal EB, a first output port configured to output the electronic logic signal MD3, and a second output port configured to output the electronic logic signal E5.

Components described above may be implemented by a plurality of logic gates and electrical connections between the plurality of logic gates.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with commands stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by one or more processors, and may cause the processor(s) to perform certain aspects of the functions described in the present disclosure.

If implemented in software, the techniques described above may be stored on a computer-readable medium as one or more commands or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of commands or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may be present in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some aspects herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A processing device, comprising:
   multiplier circuitry having a first port configured to receive a signal part covering a mantissa part and an integer part of a first electronic logic signal, a second port configured to receive a mantissa part of a second electronic logic signal, and an output port configured to output an electronic logic signal representing a product of mantissas represented by the mantissa parts of the first and second electronic logic signals in response to a mode signal indicating that the first electronic logic signal represents a floating-point number and output an electronic logic signal representing a product of an integer represented by the integer part and a mantissa represented by the mantissa part of the second electronic logic signal in response to the mode signal indicating that the first electronic logic signal represents an integer;
   an aligning circuit having a first port configured to receive an exponent part of a third electronic logic signal, a second port configured to receive an electronic logic signal representing an exponent of a product of the first and second electronic logic signals, and a third port configured to receive a mantissa part of the third electronic logic signal, the aligning circuit being configured to shift a signal applied to the third port of the aligning circuit based on signals applied to the first and second ports of the aligning circuit to generate and output a shifted electronic logic signal to an output port;
   an arithmetic logic circuit having a first port which a signal outputted from the output port of the aligning circuit is applied, a second port which a signal outputted from the output port of the multiplier circuitry is applied, and an output port configured to output an electronic logic signal representing a mantissa of a sum of a product of the first and second electronic logic signals and the third electronic logic signal in response to signals applied to the first and second ports of the arithmetic logic circuit; and
   a first exponent calculating circuit having a first port configured to receive an exponent part of the first electronic logic signal, a second port configured to receive an exponent part of the second electronic logic signal, and an output port configured to output an electronic logic signal representing an exponent of a product of the first and second electronic logic signals in response to signals applied to the first and second ports of the first exponent calculating circuit,
   wherein the electronic logic signal outputted from the output port of the first exponent calculating circuit is generated further in response to the mode signal indicting whether the first electronic logic signal represents a floating-point number or an integer.

2. The processing device of claim 1, wherein the output port of the first exponent calculating circuit is configured to:
   output an electronic logic signal representing a sum of exponents represented by the first and second exponent parts in response to the mode signal indicating that the first electronic logic signal represents a floating-point number, and
   output an electronic logic signal representing the exponent part of the second electronic logic signal in response to the mode signal indicating that the first electronic logic signal represents an integer.

3. The processing device of claim 2, wherein the first exponent calculating circuit comprises:
   an adding circuit having a first port configured to receive the exponent part of the first electronic logic signal, a second port configured to receive the exponent signal part of the second electronic logic signal, and output port configured to output an electronic logic signal representing a sum of exponents represented by the first and second exponent parts, and
   a multiplexer circuit having a first port electrically connected to the output port of the adding circuit, a second port configured to receive the exponent part of the second electronic logic signal, and an output port configured to output a signal applied to the first port in response to the mode signal indicating that the first electronic logic signal represents a floating-point number and output a signal applied to the second port in response to the mode signal indicating that the first electronic logic signal represents an integer.

4. The processing device of claim 1, wherein the aligning circuit comprises:
   a bit extender circuit having an input port configured to receive the mantissa part of the third electronic logic signal and an output port configured to output an extended electronic logic signal of the mantissa part of the third electronic logic signal,
   a subtractor circuit having a first port configured to receive the exponent part of the third electronic logic signal, a second port configured to receive an electronic logic signal representing an exponent of a product of the first and second electronic logic signals, and an output configured to output a difference between signals applied to the first and second ports, and a shifter circuit having a first port electrically connected to the output port of the bit extender circuit and a second port electrically connected to the output port of the subtractor circuit, the shifter circuit being configured to shift a signal applied to the first port based on a signal applied to the second port to generate the shifted electronic logic signal.

5. The processing device of claim 1, wherein the multiplier circuitry comprises:

a first multiplier circuit having a first port configured to receive the mantissa part of the first electronic logic signal, a second port configured to receive the mantissa part of the second electronic logic signal, and an output port configured to output an electronic logic signal representing a product of mantissas represented by the mantissa parts of the first and second electronic logic signals, a second multiplier circuit having a first port configured to receive the integer part, a second port configured to receive the mantissa part of the second electronic logic signal, and an output port configured to output an electronic logic signal representing a product of an integer represented by the integer part and a mantissa represented by the mantissa part of the second electronic logic signal, and a multiplexer circuit having a first port electrically connected to the output port of the first multiplier circuit, a second port electrically connected to the output port of the second multiplier circuit, and an output port configured to output a signal applied to the first port in response to the mode signal indicating that the first electronic logic signal represents a floating-point number and output a signal applied to the second port in response to the mode signal indicating that the first electronic logic signal represents an integer.

6. The processing device of claim 5, wherein the multiplier circuitry further comprises:

a bit extender circuit having an input port electrically connected to the output port of the multiplexer, the bit extender circuit being configured to extend a signal applied to the input port of the bit extender circuit to generate an extended electronic logic signal to be outputted to the output port of the multiplier circuitry.

7. The processing device of claim 1, wherein the arithmetic logic circuit further has a third port which an electronic logic signal representing an exponent of a product of the first and second electronic logic signals is applied and is configured to output an electronic logic signal representing an exponent of a sum of a product of the first and second electronic logic signals and the third electronic logic signal in response to signals applied to the first, second and third ports of the arithmetic logic circuit.

8. The processing device of claim 1, further comprising:

a plurality of first registers configured to store and output the first electronic logic signal, the second electronic logic signal, and the third electronic logic signal.

9. The processing device of claim 1, wherein the number of bits in the electronic logic signal outputted from the output port of the multiplier circuitry is greater than a sum of the number of bits representing mantissas represented by the mantissa part of the first electronic logic signal and the number of bits representing mantissas represented by the mantissa part of the second electronic logic signal.

10. The processing device of claim 9, wherein a plurality of most significant bits of the electronic logic signal has zero value and a plurality of least significant bits of the electronic logic signal has zero value.

11. The processing device of claim 1, wherein the arithmetic logic circuit comprises:

a plurality of second registers configured to store and output an electronic logic signal outputted from the output port of the aligning circuit and an electronic logic signal outputted from the output port of the multiplier circuitry.

12. The processing device of claim 11, wherein the arithmetic logic circuit further comprises:

an adding circuit having a first port which the electronic logic signal outputted from the output port of the aligning circuit is applied, a second port which the electronic logic signal outputted from the output port of the multiplier circuitry is applied, and an output port configured to output an electronic logic signal representing a sum of an electronic logic signal applied to the first port and an electronic logic signal applied to the second port.

13. The processing device of claim 12, wherein the arithmetic logic circuit further comprises:

a leading zero anticipating circuit having a first port which the electronic logic signal outputted from the output port of the aligning circuit is applied, a second port which the electronic logic signal outputted from the output port of the multiplier circuitry is applied, and an output port configured to output an electronic logic signal representing an anticipated number of leading zeros in a sum of an electronic logic signal applied to the first port and an electronic logic signal applied to the second port.

14. The processing device of claim 13, wherein the arithmetic logic circuit further comprises:

a plurality of third registers configured to store and output an electronic logic signal outputted from the output port of the leading zero anticipating circuit and an electronic logic signal outputted from the output port of the adding circuit.

15. The processing device of claim 14, wherein the arithmetic logic circuit further comprises:

a normalizing circuit having a first port configured to receive an electronic logic signal outputted from the output port of the adding circuit, a second port configured to receive an electronic logic signal outputted from the output port of the leading zero anticipating circuit, and an output port configured to output an electronic logic signal representing a mantissa of a sum of a product of the first and second electronic logic signals and the third electronic logic signal in response to signals applied to the first and second ports of the arithmetic logic circuit.

16. The processing device of claim 15, wherein the arithmetic logic circuit further comprises:

a second exponent calculating circuit having a first port configured to receive an electronic logic signal outputted from the output port of the adding circuit, a second port configured to receive an electronic logic signal outputted from the output port of the leading zero anticipating circuit, and an output port configured to output an electronic logic signal representing an exponent of a sum of a product of the first and second electronic logic signals and the third electronic logic signal in response to signals applied to the first and second ports of the arithmetic logic circuit.

17. The processing device of claim 16, wherein the arithmetic logic circuit further comprises:
a plurality of fourth registers configured to store and output an electronic logic signal outputted from the output port of the second exponent calculating circuit and an electronic logic signal outputted from the output port of the normalizing circuit.

* * * * *